US007558709B2

(12) United States Patent
Subbarao

(10) Patent No.: US 7,558,709 B2
(45) Date of Patent: Jul. 7, 2009

(54) METHODS AND APPARATUS FOR COMPUTING THE INPUT AND OUTPUT SIGNALS OF A LINEAR SHIFT-VARIANT SYSTEM

(76) Inventor: Muralidhara Subbarao, 95 Manchester La., Stony Brook, NY (US) 11790

(*) Notice: Subject to any disclaimer, the term of this patent is extended or adjusted under 35 U.S.C. 154(b) by 317 days.

(21) Appl. No.: 11/235,724

(22) Filed: Sep. 26, 2005

(65) Prior Publication Data

US 2006/0101106 A1  May 11, 2006

Related U.S. Application Data

(60) Provisional application No. 60/626,028, filed on Nov. 8, 2004.

(51) Int. Cl.
*G06F 7/60* (2006.01)

(52) U.S. Cl. .......................................... 703/2
(58) Field of Classification Search .................. 703/2; 708/400, 402–405
See application file for complete search history.

(56) References Cited

U.S. PATENT DOCUMENTS 4,965,840 A   10/1990   Subbarao
5,148,209 A    9/1992   Subbarao

OTHER PUBLICATIONS

"Inverse Filtering for Linear-Shift Variant Imaging Systems." Robbins et al., IEEE 1972.*
"Band-Limited Signal Extrapolation in the Presence of Noise." Sanz et al. IEEE 1984.*

* cited by examiner

*Primary Examiner*—Kamini S Shah
*Assistant Examiner*—Saif A Alhija

(57) ABSTRACT

This invention is based on a new signal processing transform named Rao Transform (RT) which was invented recently by the author of the present invention. Forward RT provides a computationally efficient method and an associated apparatus for computing the output signal of a Linear Shift-Variant System (LSVS) from the input signal and a set of moment parameters of the linear Shift-Variant Point Spread Function (SV-PSF) that characterizes the LSVS. Inverse RT provides a computationally efficient method and an associated apparatus for computing the input signal or restored signal of an LSVS from the output signal and a set of moment parameters of the linear SV-PSF that characterizes the LSVS. This invention is useful in many applications including the restoration of defocus blurred and motion blurred images recorded by a camera with a linear SV-PSF. The apparatus include means for computing forward and inverse RT coefficients.

20 Claims, 6 Drawing Sheets

Method of computing the output signal using RT

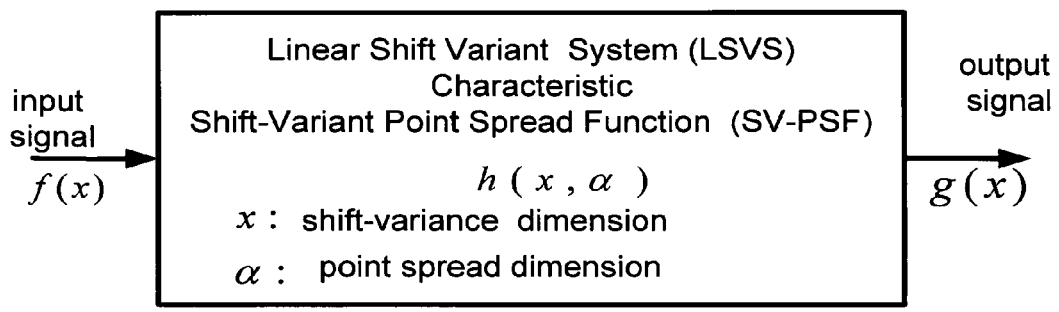
FIG. 1. Prior Art: Linear Shift Variant System
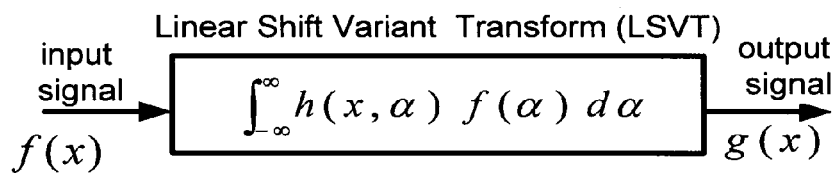
FIG. 2. Prior Art: Conventional modeling of LSVS using LSVT
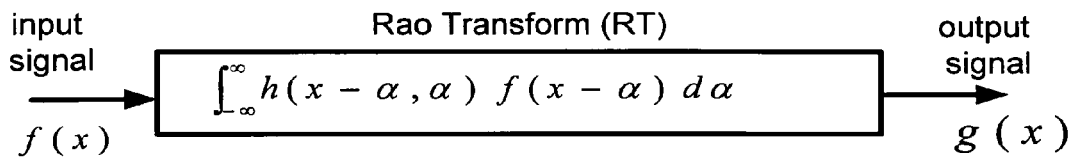
FIG. 3. Novel modeling of LSVS using RT

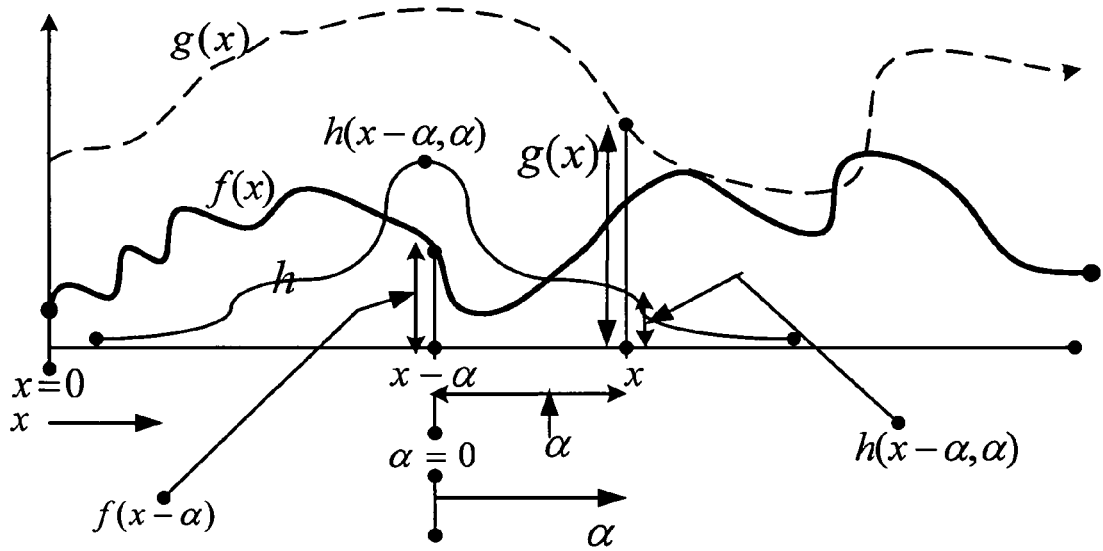
$$g(x) = \int_{-\infty}^{\infty} h(x-\alpha,\alpha)\ f(x-\alpha)\ d\alpha$$
FIG. 4. Physical motivation for using Rao Transform (RT)
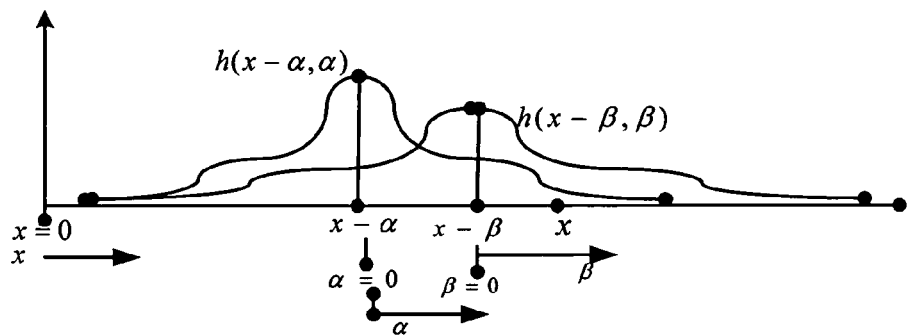
FIG. 5. An example of an SV-PSF

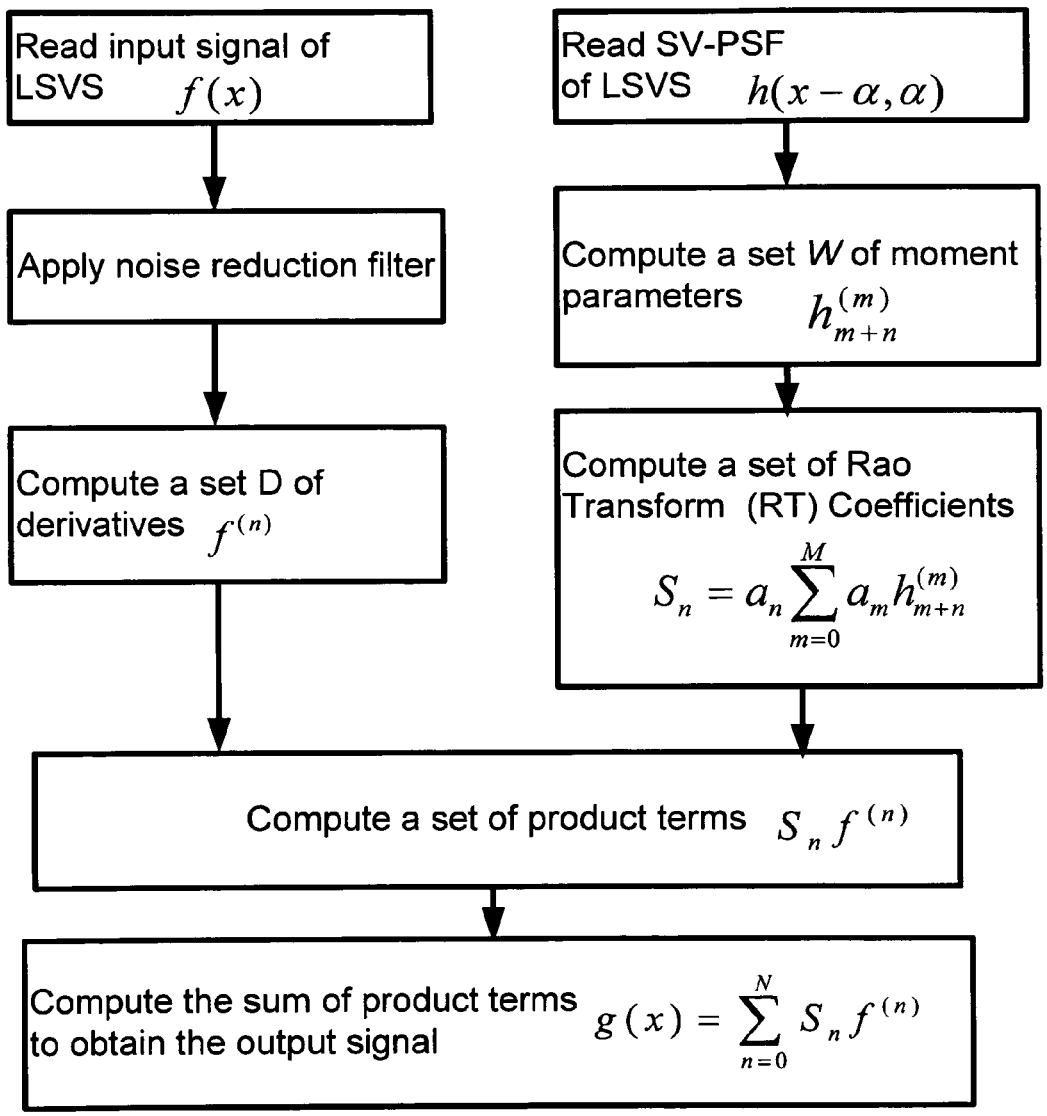
FIG. 6. Method of computing the output signal using RT

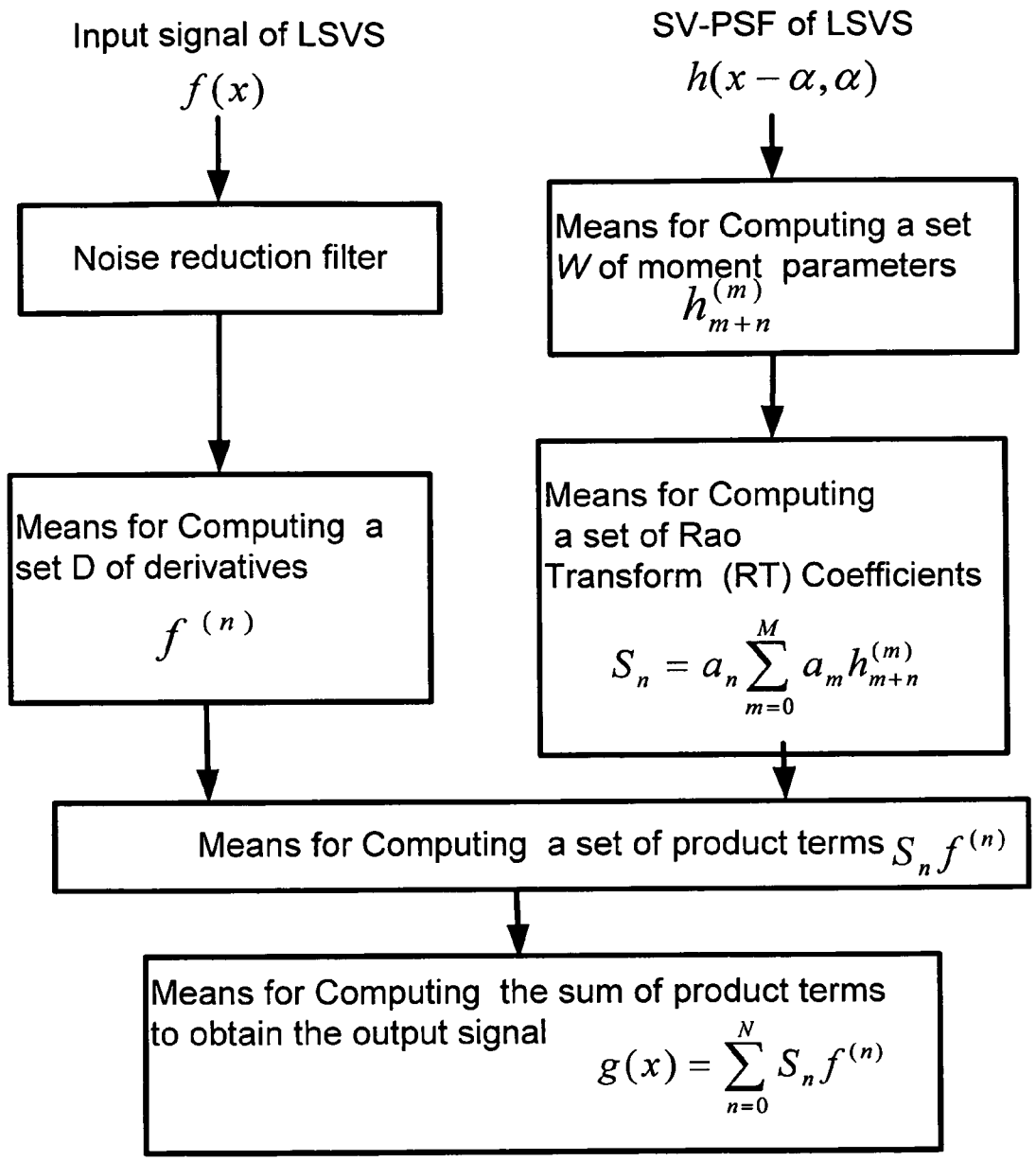
FIG. 7. Apparatus for computing the output signal using RT

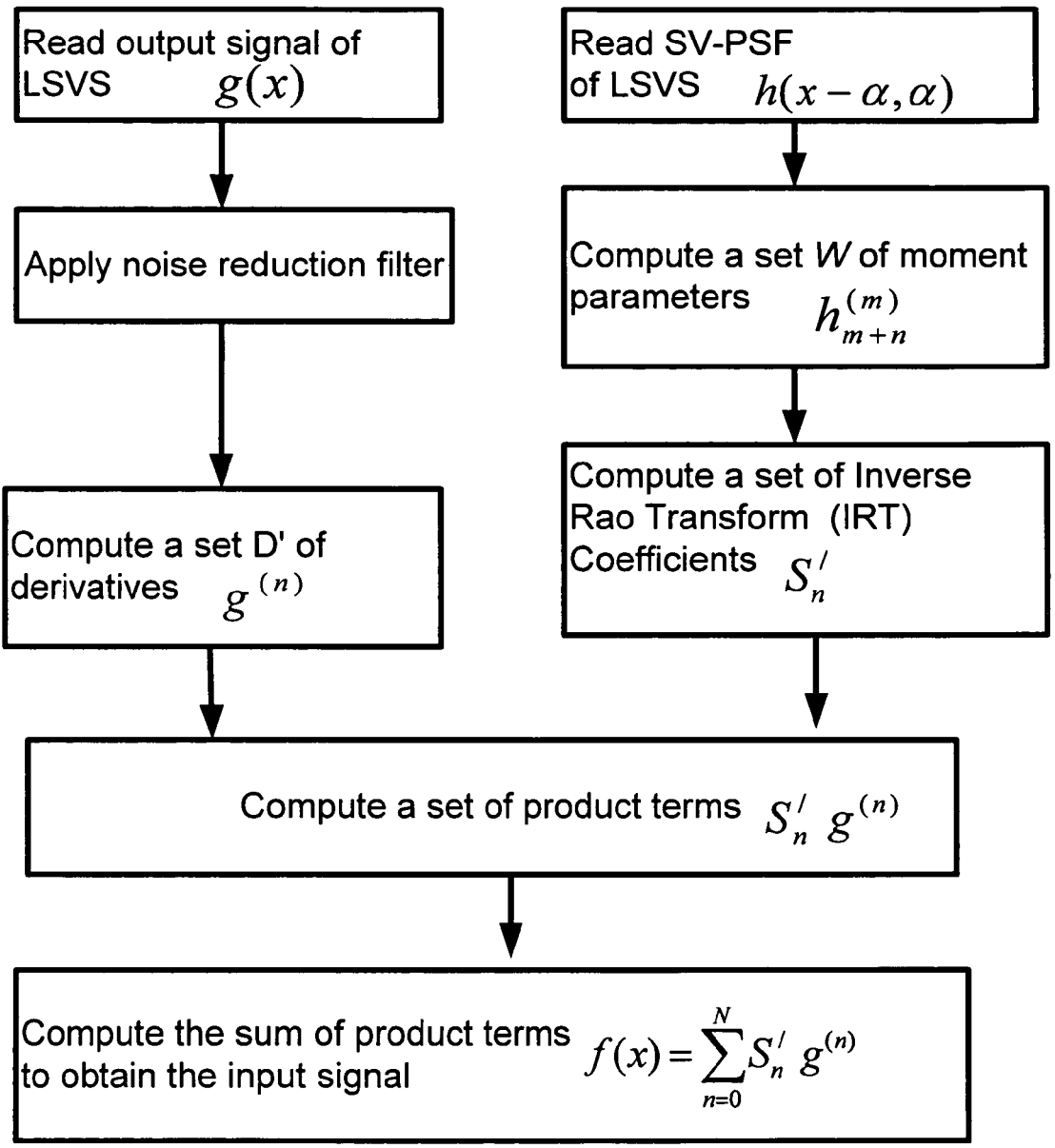
Figure 8. Method of computing the input signal using IRT

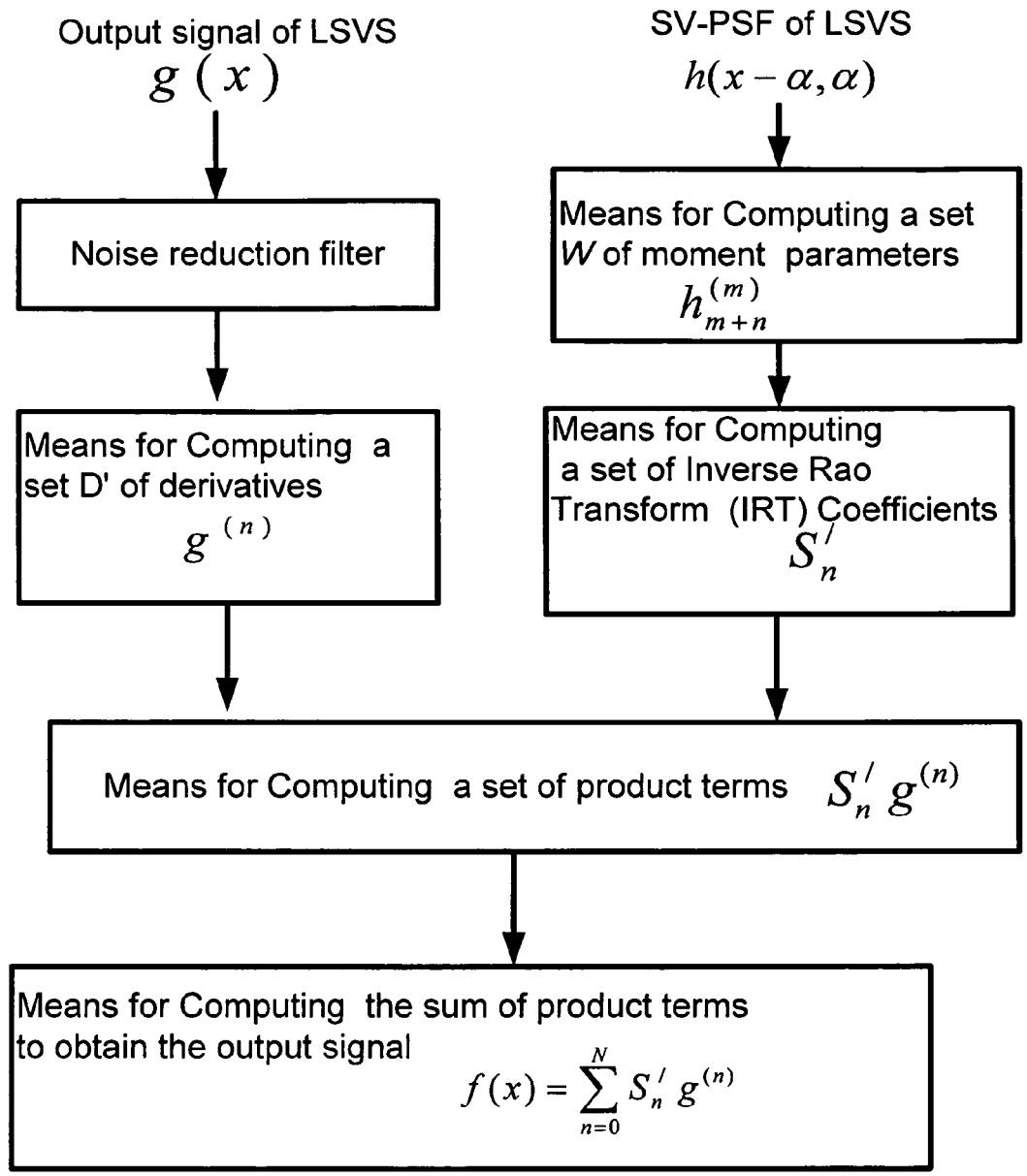
Figure 9. Apparatus for computing the input signal using IRT

METHODS AND APPARATUS FOR COMPUTING THE INPUT AND OUTPUT SIGNALS OF A LINEAR SHIFT-VARIANT SYSTEM

This patent application is based on the provisional patent application filed by this inventor on Nov. 8, 2004, Ref. No. 16800 U.S. PTO, 60/626028, with the same title as this application. Except for minor notational changes and some sentences, this application is substantially the same as the provisional patent application.

1. BACKGROUND OF THE INVENTION

The present invention provides a computationally efficient method and an associated apparatus for computing the output signal g of a Linear Shift-Variant System (LSVS) given the input signal f and a set of moment parameters w of the Shift-Variant Point Spread Function (SV-PSF) h that characterizes the LSVS. The present invention also provides a computationally efficient method and an associated apparatus for computing the input signal or restored signal f of an LSVS given the output signal g and a set of moment parameters w of the SV-PSF h that characterizes the LSVS. This invention is based on a new signal processing transform named Rao Transform (RT) which was invented recently by the author of the present invention and first disclosed here. Forward RT is used for computing the output signal from input signal and inverse RT is used for computing the input or restored signal from the output signal.

There are many physical systems that can be modeled by an LSVS. A typical example is a misfocused camera system where the input signal is a focused image f, output signal g is the blurred image recorded by the camera, and an SV-PSF h of the camera which completely characterizes the image formation in the camera. We use a misfocused camera as an important example for describing the methods and apparatus of the present invention for the sake of simplicity, clarity, and brevity. However, the present invention is not limited to this particular example alone, but is applicable to any general LSVS.

In the case of a misfocused camera, the present invention can be used to restore shift-variant blurred images recorded by the camera given a set of moment parameters w of its SV-PSF h. This application is sometimes referred to as deblurring or restoration of spatially-variant blurred images or restoration of shift-variant defocused images. The present invention can also be used to efficiently compute the output blurred image g of the camera given the input focused image f and the moments of the derivatives of the SV-PSF h. This problem of computing the output signal g from the input signal f arises in the computer simulation and design of a camera system. It may also be used in generating computer animated movie frames where an image frame should contain shift-variant blur to produce the effect of depth or 3D in a scene.

The present invention is based on the recently invented RT for signal processing. RT is a more efficient and natural alternative to the conventional modeling of many practical LSVSs by a Linear Shift-Variant Transform (LSVT). Unlike LSVT, RT is computationally very efficient. It provides an explicit, non-iterative, and closed-form formula for computing the input signal f of an LSVS given the output signal g and a set of moment parameters w of its SV-PSF h. Further, unlike LSVT, RT is naturally suited for local or short-interval or small window signal processing and analysis. RT characterizes signals in a small window using its derivatives which are local features of the signal. Similarly, unlike LSVT, RT provides a computationally efficient method for computing the output signal g of an LSVS given the input signal f and a set of moment parameters w of its SV-PSF h. The method provides a formula that is explicit, non-iterative, in closed-form, and suitable for local signal processing and analysis.

In the computation of input or restored signal f using g and a set of moment parameters w of h, f is obtained as a sum of a set of product terms where each term is the product of a derivative of g with the Inverse Rao Transform (IRT) coefficient $S'_n$ of g with respect to h. The IRT coefficients $S'_n$ are computed from a set of moment parameters w which comprises the signal domain moments of shift-variance derivatives of h.

Similarly, in the computation of output signal g using f and the set of moment parameters w of h, output signal g is obtained as a sum of a set of product terms where each term is the product of a derivative of f with the forward RT coefficient $S_n$ of input signal f with respect to SV-PSF h. The RT coefficients are computed from the signal domain moments of shift-variance derivatives of h.

In the field of the present invention, computing the input or restored signal f from the output or blurred signal g is considered to be a very difficult and computationally very expensive problem. The present invention addresses this problem and provides a novel method and apparatus for solving this problem. On the other hand, the reverse problem of computing the output or blurred signal g from the input signal f is not considered to be a very hard problem in comparison with the former problem. Nevertheless, the present invention provides a novel method and apparatus for this problem also.

The present invention is also applicable to non-linear systems that can be reformulated or transformed (e.g. through a log transform to convert products to summation) so that they can be modeled by an LSVS. The methods and apparatus disclosed here have applications in many areas of signal and image processing such as medical images, industrial images for inspection and measurement, images captured by many types sensors like digital cameras, microscopes, telescopes, X-ray imaging devices, MRI and radiation based imaging devices, aerial/satellite imagery of the earth, etc.

This invention is relevant to the processing of general multi-dimensional signals including 1-dimensional (1D) time signals, 2-dimensional (2D) image signals, 3-dimensional (3D) video data, 3D X-ray tomographic data, 3D seismographic data, and, in general, n-dimensional signals where n is a positive integer.

1.1 Description of Prior Art

Restoration of signals degraded by an LSVS finds applications in many areas of signal processing. For example, in image processing, the shift-variant (or space-variant or spatially variant blurred image of an object can be restored to obtain a focused image of the object. The shift-variant blurring may be due to camera misfocus of a 3D object, relative motion between the camera and an object being imaged (as when the camera shakes or the object is moving), aberration of the optical system as in astronomical telescopes with spherical aberrations, and atmospheric turbulence in the case of aerial and satellite images.

Four major approaches are found in prior art for the restoration of shift-variant blurred images (SVBI). The first approach is based on the assumption of piecewise shift-invariance. In this approach, the shift-variance of the Point Spread Function (PSF) h is assumed to be spatially smooth, slow, and therefore small in small image regions. Therefore, in small image regions, the effect of shift-variance of the PSF is ignored and the SV-PSF is approximated by a Shift-Invariant PSF (SI-PSF). In this case, a large Shift-Variant Blurred Image (SVBI) is cut into many smaller image pieces or image blocks, and each image block is processed and restored separately using appropriate SI-PSFs. An example of this approach can be found in the following journal paper:

M. Subbarao, T. Wei, and G. Surya, "Focused Image Recovery from Two Defocused Images Recorded with Different Camera Settings," *IEEE Transactions on Image Processing*, Vol. 4, No. 12, 16 pages, December 1995.

A similar approach is described in the following two patents:

M. Subbarao, "Passive ranging and rapid autofocusing," U.S. Pat. No. 5,148,209, Sep. 15, 1992;

M. Subbarao, "Method and apparatus for determining the distances between surface patches of a three-dimensional spatial scene and a camera system," U.S. Pat. No. 4,965,840, Oct. 23, 1990.

The resulting restored image blocks are put back together to obtain the complete or full restored image. This approach produces visible and unacceptable errors at the borders of the blocks in the full image. These errors increase as the actual blurring process deviates increasingly from the assumed model of a slowly and smoothly changing SV-PSF.

The second approach for the restoration of SVBIs is based on image warping. An image is geometrically warped or transformed or distorted in such a way that the resulting warped image can be approximated by a Shift-Invariant Blurred Image (SIBI). Finding a suitable image warping transformation is complicated in all but a few special cases. Even then, this approach again results in errors in restoration. An example of this approach can be found in:

McNown and Hunt, 1994, "Approximate Shift-Invariance by Warping Shift-Variant Systems", pp 181-187, The Restoration of HST Images and Spectra II, Space Telescope Science Institute, Eds. R. J. Hanisch and R. L. White.

Prior art on Fourier transform based methods are described in The references below but they are computationally expensive and not localized:

G. M. Robbins and T. S. Huang, Proceedings of the IEEE, Vol. 60, No. 7, July 1972; J. L. C Sanz and T. S. Huang, Band-Limited Signal Extrapolation in the Presence of Noise, IEEE, 1984.

The third main approach is based on a Singular Value Decomposition (SVD) technique. For example, see Section 12.3, pages 376 to 382, in W. K. Pratt, Digital Image Processing, Second Edition, John Wiley and Sons, 1 991, ISBN 0-471-85766-1. Also see Section 8.9, pages 299 to 301, in A. K. Jain, Fundamentals of Digital Image Processing, Prentice-Hall, Inc., 1989, ISBN 0-13-336165-9.

This involves computing the Singular Value Decomposition (SVD) of the digitized SV-PSF h. For a relatively small image of size 250 rows and 250 columns, this method requires computing the inverse or the SVD of a matrix of size $250^2 \times 250^2$ or a matrix of size $62,500 \times 62,500$. This is a staggering computational task that is totally impractical for use in practical applications. In comparison, the present invention involves inverting matrices of about 5×5 size and computing image derivatives (in about 10×10 size) at each of the 250× 250 pixels. The present invention is very practical and feasible in terms of its computational requirements.

Some other known approaches use a statistical or stochastic model of signals such as the mean, variance, distribution type, or the autocorrelation of the signals. Such information is frequently not available in practical applications. In contrast, the present invention does not require any statistical model of the signals. A few other approaches use a computationally expensive iterative algorithm for signal restoration unlike an explicit and computationally efficient method provided by the present invention. Some examples of such approaches can be found in Section 12.4 and 12.5, pages 382 to 392, W. K. Pratt, Digital Image Processing, Second Edition, John Wiley and Sons, 1991, ISBN 0-471-85766-1. These approaches are susceptible to error when the underlying assumption or image model is not valid.

1.2 Objects of the Invention

It is an object of the present invention to provide methods and associated apparatus for computing the input or restored signal and output signal of an LSVS characterized by an SV-PSF using RT that is computationally efficient and localized (unlike LSVT), non-iterative, deterministic, employing explicit and closed form formulas and algorithms, and not using any statistical or stochastic model of the images.

It is an object of the present invention to provide a method and an apparatus for efficiently computing the input or restored signal of an LSVS given the output or degraded signal and a set of moment parameters of the SV-PSF that characterizes the LSVS.

It is another object of the present invention to provide a method and an apparatus for efficiently computing the output signal of an LSVS given the input signal and a set of moment parameters of the SV-PSF that characterizes the LSVS.

It is another object of the present invention to provide a computationally efficient method and an apparatus for restoring images blurred by a misfocused camera or a motion-blurred image with an SV-PSF.

An object of the present invention is a method for restoring a signal degraded by an LSVS in a robust manner using only global statistical properties such as a set of moment parameters of the SV-PSF, and not requiring information about the exact shape of the SV-PSF.

Another object of the present invention is to provide a method of restoring signals degraded by an LSVS, wherein the quality of the restoration can be improved in a gradual manner as more information is added about the global properties of the SV-PSF such as its higher order moments of its derivatives.

Another object of the present invention is a method of restoring a signal degraded by an LSVS wherein the value of the restored signal at any point is computed using only those values of the degraded signal which lie within a small interval or region surrounding the point. Thus the computation is local in nature leading to efficiency, accuracy, and the ability to be implemented on parallel computational hardware.

Another object of the present invention is to provide an efficient, simple, and cost effective apparatus for implementing the method of the present invention for computing the input signal of an LSVS from its output and a set of moment parameters of its SV-PSF.

Another object of the present invention is to provide an efficient, simple, and cost effective apparatus for implementing the method of the present invention for computing the output of an LSVS from its input and a set of moment parameters of its SV-PSF.

1.3 Advantages

The method of the present invention does not use iterative or statistical model based approach. It uses an explicit closed-form equation for computing the input signal f using Inverse RT. The input signal f is computed as a weighted sum of the derivatives of the output signal g. The weighting coefficients are the IRT coefficients of g with respect to the SV-PSF h. They are predetermined functions of the moments of the various derivatives of the SV-PSF h.

The conventional LSVS signal restoration technique based on SVD computation has many serious deficiencies. First, its computational requirement is prohibitively high. Second, it needs an accurate knowledge of the SV-PSF h. In many applications, sufficiently accurate knowledge about the SV-PSF h will not be available. For example, in the case of a defocused camera system, the SV-PSF is a very complicated function. Therefore, an approximation to the SV-PSF will have to be used. However, because the output of the restoration is very sensitive to the exact shape of the SV-PSF, such approximations could give results which are highly erraneous. In summary, existing techniques such as those based on SVD do not provide a clear and systematic way to ignore precise shape of the SV-PSF h and use global statistical properties of the SV-PSF such as its moment parameters.

2.0 SUMMARY OF THE INVENTION

The present invention includes two methods and two associated apparatus. Each of them is summarized below.

2.1 Method of Computing Output Signal from Input Signal

The present invention discloses a method of computing the output signal $g(x)$ of a Linear Shift-Variant System (LSVS) at a point x corresponding to an input signal $f(x)$. This method is shown in FIG. 6. Here g is a function of the independent variable x which may be a 1-dimensional variable or a multi-dimensional vector. The LSVS is characterized by a Shift-Variant Point Spread Function (SV-PSF) or Shift-Variant Impulse Response Function (SV-IRF) $h(x,\alpha)$. Here h is a function of two independent variables x and $\alpha$. Both may be 1-dimensional variables or multi-dimensional vectors. In a physical LSVS, x will be used to represent the variable on which the parameters of the Point Spread Function (PSF) or Impulse Response Function (IRF) depends. This variable, i.e. x, will be referred to as the shift-variance variable (SHVV). In a physical LSVS, $\alpha$ will be used to represent the variable on which the value of the PSF or the IRF itself (not its parameters) depend. It will be referred to as the spread variable (SPV) or the response variable (REV). The method of the present invention comprises the following steps.

First, a set of Rao Transform (RT) coefficients $S_n$ for n=0, 1, 2, ..., N for some positive integer N of the said input signal $f(x)$ with respect to the said SV-PSF $h(x,\alpha)$ is computed. The Rao Transform is defined as $$g(x) = \int_{-\infty}^{\infty} h(x-\alpha, \alpha) f(x-\alpha) d\alpha.$$

This is a novel transform invented by this author recently. It elegantly captures the physical process of transformation of an input signal into an output signal in an LSVS. It specifically captures the fact that the SV-PSFs are localized with respect to $\alpha$, i.e. most of the energy of h is contained in a relatively small region around $\alpha$=0. It also captures the fact that, within the small region in which most of the energy of h is contained, the input signal f is smooth and does not change drastically. The coefficients $S_n$ of RT are obtained as follows. A Taylor series expansion of $h(x-\alpha,\alpha)$ around the point $(x,\alpha)$ up to some order M where M is a positive integer is substituted into the above definition of RT. Also, a Taylor series expansion of $f(x-\alpha)$ around the point x up to the positive integer N is substituted in the above definition of RT. After these two substitutions, the resulting expression for $g(x)$ in RT is simplified and expressed as a sum of the derivatives of $f(x)$ with respect to x at x multiplied by a coefficient $S_n$ as below:

$$g(x) = \sum_{n=0}^{N} S_n f^{(n)}.$$

wherein $f^{(n)}$ denotes an n-th order derivative of $f(x)$ with respect to x at x. Also, $S_n$ will be functions of moments with respect to $\alpha$ of the derivatives with respect to x of said SV-PSF h at the point $(x,\alpha)$. A k-th order moment of h is defined as $$h_k(x) = \int_{-\infty}^{\infty} \alpha^k h(x, \alpha) d\alpha$$

The next step in the method of the present invention is to compute a set of derivatives $f^{(n)}$ for n=0,1,2, ..., N, with respect to x at x of the input signal $f(x)$.

The next step is multiplying each RT coefficient $S_n$ by its corresponding input signal derivative $f^{(n)}$ to obtain a set of product terms $S_n f^{(n)}$ for n=0,1,2, ..., N.

The final step is summing or adding all members of said set of product terms to obtain the output signal $g(x)$ of the LSVS as below:

$$g(x) = \sum_{n=0}^{N} S_n f^{(n)}.$$

This completes the method of computing the output signal $g(x)$ from the input signal $f(x)$. This equation can be appropriately interpreted for one-dimensional and multi-dimensional signals.

In the method of the invention described above, the input signal may be preprocessed by a noise reduction filter before computing its derivatives.

The method of the present invention is applicable to one-dimensional signals, two-dimensional signals, and multi-dimensional signals. The dimensionality of the signals are determined by the dimension of x and $\alpha$. In particular, the input and output signals may be one-dimensional time signals, two-dimensional image signals, multi-spectral multi-dimensional image signals, three-dimensional video signals, and computed tomographic signals.

The method of the present invention is useful in particular for a camera system or any optical imaging system modeled by an LSVS.

2.2 Method of Computing Input or Restored Signal from Output Signal

Another method of the present invention is for computing the input or restored signal $f(x)$ of a Linear Shift-Variant System (LSVS) at a point x corresponding to an output signal $g(x)$. This method is shown in FIG. 8. The LSVS is characterized by an SV-PSF or SV-IRF $h(x,\alpha)$. The method comprises the following steps.

1. Compute a set of Inverse Rao Transform (IRT) coefficients $S'_n$ for $n=0,1,2,\ldots,N$ for some positive integer N of the output signal $g(x)$ with respect to the SV-PSF $h(x,\alpha)$. Here IRT is derived by considering the forward Rao Transform of the input signal $f(x)$ with respect to the SV-PSF $h(x,\alpha)$ in a summation form $$g(x) = \sum_{n=0}^{N} S_n f^{(n)}.$$

Here $S_n$ represent the RT coefficients and $f^{(n)}$ represent n-th order derivatives of the input signal $f(x)$. Derivatives of this equation are taken for orders $k=0, 1, 2, \ldots, N$, and a system of N linear equations are obtained. These equations are of the form $$g^{(k)} = \sum_{n=0}^{N} P_{k,n} f^{(n)}$$

in the N unknowns $f^{(n)}$. This system of equations is solved to obtain a solution for $f^{(0)}$. This solution is expressed in the form $$f(x) = \sum_{n=0}^{N} S'_n g^{(n)}$$

and the resulting $S'_n$ are defined as the IRT coefficients.

2. Next compute a set of derivatives $g^{(n)}$ for $n=0,1,2,\ldots,N$, with respect to x at x of the output signal $g(x)$.
3. Then multiply each IRT coefficient $S'_n$ by its corresponding output signal derivative $g^{(n)}$ to obtain a set of product terms $S'_n g^{(n)}$ for $n=0,1,2,\ldots,N$.
4. Finally, sum or add all members of the set of product terms to obtain the input or restored signal $f(x)$ of the LSVS as $$f(x) = \sum_{n=0}^{N} S'_n g^n.$$

This completes the method of computing the input or restored signal $f(x)$ from the output signal $g(x)$. This equation can be appropriately interpreted for one-dimensional and multi-dimensional signals.

In the above method of the invention, the output signal may be preprocessed by a noise reduction filter before computing its derivatives.

This method of the present invention is applicable to one-dimensional signals, two-dimensional signals, and multi-dimensional signals. The dimensionality of the signals are determined by the dimension of x and $\alpha$. In particular, the input and output signals may be one-dimensional time signals, two-dimensional image signals, multi-spectral multi-dimensional image signals, three-dimensional video signals, and computed tomographic signals.

The method of the present invention is useful in particular for a camera system and any optical imaging system modeled by an LSVS.

If the output signal is a two-dimensional image then the above restoration method can be used to obtain focused images from blurred images. The blur may have been due to either a misfocusing of the camera, or due to motion, or some other Linear Shift-Variant (LSV) degradation process such as lens aberrations, etc.

2.3 Apparatus for Computing Output Signal from Input Signal

The first apparatus of the present invention is for computing the output signal $g(x)$ of a Linear Shift-Variant System (LSVS) corresponding to an input signal $f(x)$. The LSVS is characterized by an SV-PSF or SV-IRF $h(x,\alpha)$. The apparatus is shown in FIG. 7 and it comprises the following:

1. a differentiation means for computing the derivatives of the input signal $f(x)$ to obtain a set of derivative signals $f^{(n)}$ for $n=0,1,2,\ldots,N$;
2. a Rao Transform (RT) coefficient $S_n$ computation means for computing the RT coefficients $S_n$ for $n=0,1,2,\ldots,N$, of said input signal $f(x)$ with respect to said SV-PSF h;
3. a multiplication means for multiplying each member of the set of derivative signals $f^{(n)}$ with its corresponding Rao Transform coefficient $S_n$ to obtain a set of product terms $S_n f^{(n)}$ for $n=0,1,2,\ldots,N$, and
4. a summation means for summing the set of product terms to obtain the output signal as $g(x)=\Sigma\ S^n\ f^{(n)}$ with summation over $n=0,1,2,\ldots,N$.

The computing means in this apparatus may be electronic digital devices. This apparatus may further include a noise reduction means for reducing noise in the input signal.

2.4 Apparatus for Computing Input or Restored Signal from Output Signal

The second apparatus of the present invention is for computing the input or restored signal $f(x)$ of a Linear Shift-Variant System (LSVS) corresponding to an output signal $f(x)$. The LSVS is characterized by an SV-PSF or SV-IRF $h(x,\alpha)$. The apparatus is shown in FIG. 9 and it comprises the following:

1. a differentiation means for computing derivatives of the output signal $g(x)$ to obtain a set of derivative signals $g^{(n)}$ for $n=0,1,2,\ldots,N$;
2. an Inverse Rao Transform coefficient $S'_n$ computation means for computing the IRT coefficients $S'_n$ for $n=0,1,2,\ldots,N$ of the output signal $g(x)$ with respect to said SV-PSF h;
3. a multiplication means for multiplying each member of the set of derivative signals $g^{(n)}$ with its corresponding IRT coefficient $S'_n$ to obtain a set of product terms $S'_n g^{(n)}$ for $n=0,1,2,\ldots,N$; and
4. a summation means for summing the set of product terms to obtain the input or restored signal as $f(x)=\Sigma\ S'_n\ g^{(n)}$ with summation over $n=0,1,2,\ldots,N$.

The computing means in this apparatus may be electronic digital devices. This apparatus may further include a noise reduction means for preprocessing the output signal.

The apparatus of the present invention may be implemented using electronic or optical devices. The devices can be analog or digital computers, or special purpose signal processing hardware.

3. BRIEF DESCRIPTION OF THE DRAWINGS

For a further understanding of the method and apparatus of the present invention, reference is made to the following drawings.

FIG. 1 is a schematic diagram of a Linear Shift Variant System showing the input signal, output signal, SV-PSF, and the shift-variance and point spread dimensions.

FIG. 2 shows a conventional method of modeling an LSVS using the Linear Shift Variant Transform (LSVT). This model does not exploit the locality property of an SV-PSF.

FIG. 3 shows the novel method of modeling an LSVS using the Rao Transform instead of the conventional LSVT. This model fully exploits the locality property of an SV-PSF.

FIG. 4 illustrates the physical motivation for using Rao Transform instead of LSVT. It shows plots of the input signal, output signal, and the SV-PSF of an LSVS. In this figure, it is clear that the new Rao Transform expresses the output signal in a manner that corresponds to the behavior of a physical LSVS system such as a misfocused camera.

FIG. 5 shows an example of an SV-PSF. Note the change in the shape of the SV-PSF due to the shift of the SV-PSF.

FIG. 6 is a flow chart of the method of the present invention for computing the output signal of an LSVS from its input signal using the RT.

FIG. 7 is a schematic diagram of the apparatus of the present invention for computing the output signal of an LSVS from its input signal using the novel Rao Transform.

FIG. 8 is a flow chart of the method of the present invention for computing the input signal of an LSVS from its output signal using the novel Inverse Rao Transform (IRT).

FIG. 9 is a schematic diagram of the apparatus of the present invention for computing the input signal of an LSVS from its output signal using the novel Inverse Rao Transform.

4. DETAILED DESCRIPTION OF THE PREFERRED EMBODIMENTS

The application of the present invention will be described first for one-dimensional signals, and later for two-dimensional and multi-dimensional signals.

4.1 Restoration of One-Dimensional Signals

In the preferred embodiment of the present invention, the degraded or output signal g(x) is first passed through a noise reduction filter to minimize the effect of noise. This step is carried-out using one of the well-known techniques for local smoothing of signals such as convolution with a Gaussian smoothing filter. The noise reduction step need not be a distinct step in practice and it can be carried out simultaneously in combination with other steps. Therefore, for the sake of notational simplicity, the output of the noise reduction step will also be denoted by g(x). After the noise reduction step, the degradation in the signal g(x) is predominantly due to LSVT of the original signal f(x) with the SV-PSF h(x,α).

The classical definition of the Linear Shift-Variant Transform (LSVT) which is used in prior art is expressed by the equation (see FIG. 2):

$$g(x) = \int_{-\infty}^{\infty} h'(x, \alpha) f(\alpha) d\alpha. \quad (1)$$

where, we have denoted the SV-PSF by h'(x,α) to distinguish it from h(x,α) used later. The above definition of LSVT has two problems. First, this definition of LSVT makes it very difficult to find an explicit closed-form inversion formula. Therefore, one will have to resort to complicated mathematical tools such as Singular Value Decomposition (SVD). Second, although the definition is mathematically satisfactory, it does not model an actual physical LSVS in a natural, intuitive, and elegant way. One way to model the actual process that takes place in a physical LSVS in an intuitive and elegant way is shown in FIG. 4. In this Figure, the output degraded signal g is measured at a point x. The contribution of a point source located at x−α to g(x) is given by the product of the strength of the signal point source f(x−α) multiplied by the value of the corresponding SV-PSF at x. We choose to parameterize and define SV-PSF such that its shift-variance parameter is x−α instead of x. This SV-PSF is then denoted by h(x−α,α). Therefore, the contribution of the point source at x−α becomes the product h(x−α,α) f(x−α). The total output g(x) at x is then given by the sum or integration of contribution due to all point sources. This is given by (see FIG. 3)

$$g(x) = \int_{-\infty}^{\infty} h(x - \alpha, \alpha) f(x - \alpha) d\alpha. \quad (2)$$

The above equation defines the Rao Transform (RT) which is named after this inventor (which is a common practice in mathematics) for defining the transform and deriving the inverse of this transform. RT defines how a given input signal f(x) is transformed by a Linear Shift-Variant System (LSVS) which is characterized completely and uniquely by a Shift-Variant Point Spread Function h(x,α). RT, unlike the classical definition of LSVT, models the physical process in an LSVS in a natural, intuitive, and elegant way. Through a careful analysis of the definition of LSVT in (1) that uses the SV-PSF h'(x,α), and RT in (2) that uses the SV-PSF h(x,α), we can show that $$h'(x,\alpha) = h(\alpha, x-\alpha). \quad (3)$$

The above equation is useful for obtaining the SV-PSF of LSVT (i.e. h') given the SV-PSF of RT and vice versa. ST, unlike LSVT, facilitates the derivation of an explicit closed-form formula for inverting the transform. This formula can be easily and efficiently implemented in the apparatus of the present invention. Further, this inversion formula is expected to lead to further theoretical insights, advances, and novel signal processing applications in the case of LSVS. Researchers in many areas of engineering and sciences have been searching for a computationally efficient method for inverting the LSVT for 50 years or more. RT may provide such an efficient solution to many practical problems that involve inverting an LSVT.

The m-th order partial derivative of the SV-PSF h(x,α) at (x,α) with respect to x is denoted by $$h^{(m)} = h^{(m)}(x, \alpha) = \frac{\partial^m h(x, \alpha)}{\partial x^m}. \quad (4)$$

Similarly, the n-th derivative of f(x) at x with respect to x will be denoted by $$f^{(n)} = f^{(n)}(x) = \frac{d^n f(x)}{d x^n}. \quad (5)$$

The n-th moment of the m-th derivative of the SV-PSF is defined by $$h_n^{(m)} = h_n^{(m)}(x) = \int_{-\infty}^{\infty} \alpha^n \frac{\partial^m h(x, \alpha)}{\partial x^m} d\alpha \quad (6)$$

Note that the derivative is with respect to x and the moment is with respect to $\alpha$. The original signal f(x) will be taken to be smooth so that it can be expanded in a Taylor series. If f(x) is not smooth, then it can be smoothed by a Gaussian smoothing filter with a small spread. If only the output g is given, then, to a good approximation, smoothing g by convolving it with a Gaussian of small spread is equivalent to first smoothing the input f and then applying the LSVT or RT to obtain the smoothed g. The Taylor series expansion of f(x−α) around the point x up to order N is $$f(x - \alpha) = \sum_{n=0}^{N} a_n(\alpha)^n f^{(n)}(x) \quad (7)$$

where $$a_n = \frac{(-1)^n}{n!}, \quad (8)$$

and $f^{(n)}$ is the n-th order derivative of f(x) with respect to x as defined in Eq. (5). The above equation is exact and free of any approximation error when f is a polynomial of degree less than or equal to N. In this case, the derivatives of f of order greater than N are all zero. When f has non-zero derivatives of order greater than N, then the above equation will have an approximation error corresponding to the residual term of the Taylor series expansion. This approximation error usually converges rapidly to zero as N increases. In the limit as N tends to infinity, the above series expansion becomes exact and complete.

We will take the SV-PSF h(x,α) to be analytic and smooth in the region of interest. This assumption holds well in practical LSVSs as the interval of a in which h has significant non-zero values is limited in extent (time/space-limited). In many practical systems such as a misfocused camera, most (about 95 to 99 percent) of the energy of the SV-PSF is concentrated in a small region, bounded by |α|<T for all x where T is a small constant. This energy content is defined by $$E(x, T) = \int_{-T}^{T} |h(x - \alpha, \alpha)| d\alpha. \quad (9)$$

This property of physical LSVS will be called the locality property since the energy spread of the SV-PSF is localized and distributed in a small region close to the origin. In fact, in a misfocused camera, under the geometric optics model of image formation which is a very good model, the SV-PSF is localized inside a blur circle and energy outside the blur circle is zero. Even when the physical optics model of image formation is used, the energy outside of a region which is a little larger than the blur circle is very small (a few percent). We will state this locality property of the SV-PSFs of physical systems as $$h(x-\alpha,\alpha) \approx \text{for } |\alpha| > T \text{ for all } x. \quad (10)$$

for some small constant T. Due to this locality property of SV-PSFs of physical systems, the contribution of any point source outside of the region to the measured signal value g at x is negligible or zero, i.e. the product h(x−α,α) f(x−α) in Equation (2) is negligible for |α|>T for all x. Therefore, the Taylor series expansion of f(x) needs to be sufficiently accurate compared to the actual signal f(x) only in the region bounded by |α|<T for all x. In many practical applications (e.g. a misfocused camera), T is relatively small (about 0.2 to 2 percent) compared with the range of x. For example, the blur circle radius in a misfocused image of size 500×500 could be 1 pixel to 10 pixels. For a typical blur of 5 pixel radius, the Taylor series expansion needs to be valid in a region of only about 10×10 region. In such a small region, due to quantization error and other noise, it becomes unnecessary to consider a large value of N in the Taylor series expansion of f. A typical value for M is 0, 1, or 2. For M≧3, we can ignore the residual error term in the series expansion. Because of these practical considerations, we truncate the Taylor series expansions in Equation (7). The Taylor series expansion of h(x−α,α) around the point (x,α) up to order M is $$h(x - \alpha, \alpha) = \sum_{m=0}^{M} a_m(\alpha)^m h^{(m)}(x, \alpha) \quad (11)$$

where $$a_m = \frac{(-1)^m}{m!} \quad (12)$$

and $$h^{(m)} = h^{(m)}(x, \alpha) = \frac{\partial^m h(x, \alpha)}{\partial x^m}. \quad (13)$$

Due to the locality property, the Taylor series above converges rapidly as M increases, and in the limit as M tends to infinity, the error becomes zero and the series expansion becomes exact and complete.

Substituting for f(x−α) from equation (7) and h(x−α,α) in Eq. (11) into the definition of RT in Equation (2), we obtain $$g(x) = \int_{-\infty}^{\infty} \left[ \sum_{n=0}^{N} a_n(\alpha)^n f^{(n)}(x) \right] \left[ \sum_{m=0}^{M} a_m(\alpha)^m h^{(m)}(x, \alpha) \right] d\alpha. \quad (14)$$

Rearranging terms and changing the order of integration and summation, we get $$g(x) = \sum_{n=0}^{N} a_n f^{(n)} \left[ \sum_{m=0}^{M} a_m \int_{-\infty}^{\infty} (\alpha)^{m+n} h^{(m)}(x, \alpha) d\alpha \right] \quad (15)$$

Using Eq. (6), the above equation becomes, $$g(x) = \sum_{n=0}^{N} a_n f^{(n)} \left[ \sum_{m=0}^{M} a_m h_{m+n}^{(m)} \right]. \quad (16)$$

The above equation, in the limit as M and N tend to infinity, is an alternative definition of RT. This formula expresses the LSVT of f(x) with respect to the SV-PSF h(x) in terms of the derivatives of f(x) and the moments with respect to α of the partial derivatives of h(x,α) with respect to x. This can be rewritten as $$g(x) = \sum_{n=0}^{N} S_n f^{(n)}, \tag{17}$$

where the weight parameter $S_n$ is $$S_n = a_n \sum_{m=0}^{M} a_m h_{m+n}^{(m)}. \tag{18}$$

$S_n$ will be referred to as Rao Transform coefficients. The above equation defines the Forward Rao Transform. The weight parameter $S_n$ is a function of the moments with respect to the spread variable α of the derivatives with respect to shift-variance variable x of the SV-PSF h.

If the SV-PSF is such that its Taylor series expansion up to M-th order is exact, i.e. m-th derivative of the SV-PSF h with respect to the shift-variance variable x is zero (i.e. $h^{(m)}=0$) for m>M, then, in the limit as N tends to infinity, the above expression defines an M-th order Rao Transform.

If M=0 in the above definition of M-th order Rao Transform, then the resulting Zero-th order Rao Transform corresponds to the shift-invariant operation of convolution. Therefore, the well-known convolution operation of Linear Shift-Invariant Systems (LSIS) is a special case of Rao Transform with M=0.

The M-th order RT for m=1,2,3, . . . , corresponds to an M-th order linear shift-variant operation (LSVO) as M is the highest order non-zero derivative of h with respect to the shift-variance variable x. Equivalently, it will be defined as the M+1-th order linear shift-invariant operation (LSIO) as all M+1-th and higher order derivatives of h with respect x are zero or the corresponding residue term is zero or negligible. According to this definition, convolution corresponds to zero-th order shift-variant or first-order shift-invariant Rao Transform. More importantly, Rao Transform generalizes the concept of shift-invariance from the well-known zero-th order RT corresponding to convolution to an arbitrary order M=1,2, 3,... This generalization suggests a rich new area of research, development, analysis, and application, for signal and image processing.

Now we will derive an explicit closed-form formula for Inverse Rao Transform (IRT). In order to derive the inverse RT, we make the approximation that all derivatives of f of order greater than N are zero, and all derivatives of h with respect to x of order greater than M are zero. This restriction can be relaxed for theoretical analysis by letting M and N tend to infinity.

We can derive the IRT as follows. The k-th derivative of g(x) with respect to x is given by $$g^{(k)}(x) = \sum_{p=0}^{k} C_p^k \sum_{n=0}^{N-p} f^{(n+p)} S_n^{(k-p)} \tag{19}$$

where $C_p^k$ is the binomial coefficient $$C_p^k = \frac{k!}{p!(k-p)!} \tag{20}$$

and $$S_n^{(k-p)} = a_n \sum_{m=0}^{M-k+p} a_m h_{m+n}^{(m+k-p)}. \tag{21}$$

Note that, in the above derivation, derivatives of f higher than N-th order and derivatives of h higher than M-th order are approximated to be negligible or zero. The above equation expresses the k-th derivative of the degraded or blurred or output signal g(x) in terms of the derivatives of the original or input signal f(x). The blurred or degraded signal g(x) is given or known, and therefore its derivatives for k=0,1,2, . . . , N, can be estimated from the given blurred signal g(x). Further, the SV-PSF is characterized in terms of the moments of its derivatives $h_{m+n}^{(m+k-p)}$ and all of them are known or given or can be estimated from the SV-PSF h. The only unknowns are the original signal f (x) which is the same as the zero-th order derivative of f denoted by $f^{(0)}$ and its N derivatives—$f^{(1)}$, $f^{(2)}$, . . . ,$f^{(n)}$. We can solve for all these unknowns using the following method.

Consider the sequence of equations obtained by writing Equation (19) for k=0,1,2, . . . , N, in that order. We have here, N+1 linear equations in the N+1 unknowns $f^{(0)}$, $f^{(1)}$, $f^{(2)}$, . . . ,$f^{(n)}$. Given all the necessary moment parameters of the derivatives of the SV-PSF, i.e. given $h_n^{(k)}$, we can solve these equations either numerically or algebraically to solve for all the unknowns, and $f^{(0)}$ in particular. In the case of numerical solution, we will have to solve a linear system of N+1 equations. In practical applications such as image restoration or deblurring, N is usually small, between 2 to 6. Therefore, at every point where the signal needs to be restored, we will need to compute the N derivatives $g^{(k)}$ given g, and invert an N+1×N+1 matrix. In Equation (19), we can regroup the terms and express it as $$g^{(k)} = \sum_{n=0}^{N} S_{k,n} f^{(n)} \tag{22}$$

for k=0,1,2, . . . , N. The coefficients $S_{k,n}$ are called the k-th derivative Rao Transform coefficients or k-th D-RT coefficients.

The above equation can also be written in matrix form as $$g = Sf \tag{23}$$

where $g=[g^{(0)}, g^{(1)}, \ldots, g^{(N)}]^t$ and $f=[f^{(0)},f^{(1)}, \ldots, f^{(N)}]^t$ are (N+1)×1 column vectors and S is an (N+1)×(N+1) matrix whose element in the k-th row and n-th column is $S_{k,n}$ for k,n=0,1,2, . . . , N. We will refer to S as the Rao Transform matrix or RT matrix.

Symbolic or algebraic solutions (as opposed to numerical solutions) to the above equations for g would be useful in theoretical analyses. These equations can be solved symbolically by using one equation to express an unknown in terms of the other unknowns, and substituting the resulting expression into the other equations to eliminate the unknown. Thus, both the number of unknowns and the number of equations are reduced by one. Repeating this unknown variable elimination process on the remaining equations systematically in sequence, the solution for the last unknown will be obtained. Then we proceed in reverse order of the equations derived thus far, and back substitute the available solutions in the sequence of equations to solve for the other unknowns one at a time, until we obtain an explicit solution for $f^{(0)}$. This approach is described in more detail with an example below.

The first equation for $k=0$ can be used to solve for $f^{(0)}$ in terms of $g^{(0)}$ and $f^{(1)}, \ldots, f^{(N)}$. The resulting expression can be substituted in the equations for $g^{(k)}$ for $k=1,2, \ldots, N$, to eliminate $f^{(0)}$ in those equations. Now we can use the expression for $g^{(1)}$ to solve for $f^{(1)}$ in terms of $g^{(0)}, g^{(1)}$, and $f^{(2)}, f^{(3)}, \ldots, f^{(N)}$. The resulting expression for $f^{(1)}$ can be used to eliminate it from the equations for $g^{(2)}, g^{(3)}, \ldots, g^{(N)}$. Proceeding in this manner, we obtain an explicit solution for $f^{(N)}$ in terms of $g^{(0)}, g^{(1)}, \ldots, g^{(N)}$. Then we back substitute this solution in the previous equation to solve for $f^{(N-1)}$. Then, based on the solutions for $f^{(N)}$ and $f^{(N-1)}$ we solve for $f^{(N-2)}$ in the next previous equation, and proceed similarly, until we solve for $f^{(0)}$. This approach will be illustrated in the examples described later.

In matrix form, the solution for f can be written as $$f = S'g \qquad (24)$$

where S' is the inverse of S. It will be referred to as the Inverse Rao Transform (IRT) matrix. This form of the solution is useful in a numerical implementation. The size of the IRT matrix S' is $(N+1) \times (N+1)$. An element of this matrix in the k-th row and n-th column will be denoted by $S'_{k,n}$ for $k,n=0, 1,2, \ldots, N$. We will refer to $S'_{k,n}$ as k-th derivative IRT coefficients. In algebraic form, we can write the solution for f as $$f^{(k)} = \sum_{n=0}^{N} S'_{k,n} g^{(n)} \qquad (25)$$

The above equation is adequate in all practical applications for obtaining f given g. In the limiting case when N and M both tend to infinity, the above inversion becomes exact and can be used as a definition of Inverse Rao Transform or IRT When we set $k=0$ in the above equation, we get the definition of Inverse Rao Transform (IRT) as $$f^{(0)} = \sum_{n=0}^{N} S'_{n} g^{(n)} \qquad (26)$$

where $S'_n = S'_{0,n}$. We call $S'_n$ as IRT coefficients. From a theoretical point of view, it is of interest to note that IRT can be written in an integral form similar to forward RT as $$f(x) = \int_{-\infty}^{\infty} h''(x-\alpha, \alpha) g(x-\alpha) d\alpha. \qquad (27)$$

where $h''(x-\alpha, \alpha)$ is the inverse SV-PSF corresponding to S'. In the limiting case when M and N tend to infinity, the inverse SV-PSF can be determined uniquely. However, in practical applications, M and N will be limited to small values. In this case, h'' may not be unique. Up to a certain ambiguity, h'' can be determined from S' by considering the relation between the moments and derivatives of h'' and the Fourier Transform of h'' As determining h'' is not necessary in practical applications such as image restoration, we will not discuss the theoretical details of determining h'' from S' here.

The first step in the method of the present invention consists of first computing the derivatives $g^{(n)}$ for $n=0,1, \ldots, N$, then computing all the k-th derivative IRT coefficients $S'_{k,n}$ using the moment parameters $h_i^{(j)}$ for $n,k=0,1, \ldots, N$, and then computing the right hand side of Equation (27). The apparatus for implementing this method is shown in FIG. 9.

Equation (26) is a new inverse linear shift-variant transform formula which is unknown in prior art. The derivatives of the degraded signal $g^{(n)}$ can be computed by local operations, i.e. the derivative at a point x can be computed using the values of the output signal g(x) in a small interval around x. In particular, it is not necessary to know the values of the signal g(x) in a very large interval. This characteristic of the present invention reduces computation dramatically and makes the method of the present invention suitable for implementation on a parallel computing hardware.

Because of the local nature of operations required by the above inverse RT formula, the amount of computation needed is low. Another important advantage of the above inverse formula is that the weights $S'_{k,n}$ are given by algebraic expressions involving the moments of derivatives of h, i.e. $h_i^{(j)}$, of the SV-PSF. These moment parameters of h specify the global or overall characteristics of the SV-PSF. In practice, such global characteristics can be estimated more robustly than the accurate shape of the SV-PSF. Accurate knowledge of the complete shape of the SV-PSF is difficult to obtain in practical applications.

In the derivation of RT and IRT so far, x and $\alpha$ are considered to be one-dimensional variables. However, they can be considered to be multi-dimensional or n-dimensional vectors as $x=[x_1, x_2, \ldots, x_n]$, $\alpha=[\alpha_1, \alpha_2, \ldots, \alpha_n]$ and the expressions for RT and IRT for this case can be easily derived by following steps very similar to those above. An example of such a derivation to two-dimensional image signals will be presented in an example considered later.

4.1.1 One-Dimensional Example with Gaussian SV-PSF

In this section we describe a concrete one-dimensional example. One practical problem for which this example is relevant is the shift-variant motion blurred images. When a photograph is captured by a moving camera with a finite exposure period (say 0.1 second), objects nearer to the camera will have larger motion blur than objects that are farther from the camera. This situation can arise when there is camera shake or vibration, or when the camera is on a moving object such as a car or a robot. This situation can also arise in a barcode reader for one-dimensional barcodes. When the plane of the barcode is slanted (instead of being perpendicular) with respect to the direction of view of the barcode reader, the barcode image will be blurred by a shift-variant point spread function due to the slanted plane.

Let $N=2$ and $M=1$, and let the SV-PSF h be a Gaussian which is $$h(x, \alpha) = \frac{1}{\sqrt{2\pi}\,\sigma(x)} \exp\left(-\frac{\alpha^2}{2\sigma^2(x)}\right) \qquad (28)$$

where $\exp(x)=e^x$. For convenience, we denote $$\rho(x) = \frac{1}{\sigma(x)}. \tag{29}$$

Therefore $$h(x, \alpha) = \frac{\rho(x)}{\sqrt{2\pi}} \exp\left(-\frac{\alpha^2 \rho^2(x)}{2}\right) \tag{30}$$

The Taylor series expansion of $h(x-\alpha,\alpha)$ around the point $(x,\alpha)$ up to order $M=1$ is $$h(x-\alpha,\alpha) = h^{(0)}(x,\alpha) + h^{(1)}(x,\alpha)(-\alpha) \tag{31}$$

where it can be shown that $$h^{(1)}(x, a) = \frac{\partial h(x, a)}{\partial x} = h(x, a)\frac{\rho_x(x)}{\rho(x)}(1 - \alpha^2 \rho^2(x)) \tag{32}$$

where $\rho_x(x)$ is the derivative of $\rho(x)$ with respect to x

We note that the above function is an even function of $\alpha$ (as it involves only $\alpha^2$). This function is symmetric, i.e. $h^{(1)}(x,\alpha) = h^{(1)}(x,-\alpha)$. Therefore, all odd moments of $h^{(1)}$ with respect to $\alpha$ will be zero. Therefore, the RT becomes (with $M=1$ and $N=2$)

$$g(x) = \int_{-\infty}^{\infty} \left(f^{(0)} - \alpha f^{(1)} + \frac{\alpha^2}{2} f^{(2)}\right)(h^{(0)} - \alpha h^{(1)})d\alpha. \tag{33}$$

Simplifying, we get $$g^{(0)} = f^{(0)}(h_0^{(0)} - h_1^{(1)}) + f^{(1)}(h_2^{(1)} - h_1^{(0)}) + f^{(2)}\frac{1}{2}(h_2^{(0)} - h_3^{(1)}) \tag{34}$$

Since all odd moments of $h^{(0)}$ and $h^{(1)}$ are zero, we set $h_1^{(0)} = h_1^{(1)} = h_3^{(1)} = 0$. This simplifies the problem. Further, we have for this case, $h_0^{(0)}=1$ and both first $h_0^{(2)}$ and second $H_0^{(2)}$ (and all higher) derivatives of $h_0^{(0)}$ are always zero. Also the first and higher derivatives with respect to x of $h_1^{(0)}$, $h_1^{(1)}$, $h_2^{(1)}$, and $h_3^{(1)}$ are all zero. Only the first derivative of $h_2^{(0)}$ may not be zero. It will be denoted by $h_2^{(1)}$. Therefore we get $$g^{(0)} = f^{(0)} + f^{(1)}h_2^{(1)} + f^{(2)}\frac{1}{2}h_2^{(0)} \tag{35}$$

Taking derivatives of the above equation once and twice, we get $$g^{(1)} = f^{(1)} + f^{(2)}h_2^{(1)} + f^{(2)}\frac{1}{2}h_2^{(1)} \tag{36}$$

and $$g^{(2)} = f^{(2)}. \tag{37}$$

We can solve the above three equations easily through successive elimination and back substitution. In this particular example, which corresponds to a typical practical application, the process of solving becomes trivial. We solve for $f^{(0)}$ using the first equation as $$f^{(0)} = g^{(0)} - f^{(1)}h_2^{(1)} - f^{(2)}\frac{1}{2}h_2^{(0)}. \tag{38}$$

We substitute this solution in the remaining two equations to eliminate $f^{(0)}$ from them. In this example, $f^{(0)}$ is not in the remaining two equations and therefore, there is nothing to do. Next we use the second equation to solve for $f^{(1)}$:

$$f^{(1)} = g^{(1)} - f^{(2)}h_2^{(1)} - f^{(2)}\frac{1}{2}h_2^{(1)}. \tag{39}$$

$$f^{(1)} = g^{(1)} - f^{(2)}\frac{3}{2}h_2^{(1)}. \tag{40}$$

We substitute this in the third equation. But since the third equation does not contain $f^{(1)}$ nothing needs to be done. Lastly we solve for $f^{(2)}$ from the third equation as $$f^{(2)} = g^{(2)}. \tag{41}$$

Now we back substitute the solution of $f^{(2)}$ into the solution of $f^{(1)}$:

$$f^{(1)} = g^{(1)} - g^{(2)}\frac{3}{2}h_2^{(1)}. \tag{42}$$

Lastly, we back substitute the solutions for $f^{(2)}$ and $f^{(1)}$ into the solution for $f^{(0)}$ and get $$f^{(0)} = g^{(0)} - g^{(1)}h_2^{(1)} - g^{(2)}\frac{1}{2}(h_2^{(0)} - 3h_2^{(1)} \cdot h_2^{(1)}) \tag{43}$$

Thus we have obtained the inverse RT for a case that is useful in practical applications. In matrix notation, the forward and inverse RT for this case can be written as $$\begin{bmatrix} g^{(0)} \\ g^{(1)} \\ g^{(2)} \end{bmatrix} = \begin{bmatrix} 1 & h_2^{(1)} & (1/2)h_2^{(0)} \\ 0 & 1 & (3/2)h_2^{(1)} \\ 0 & 0 & 1 \end{bmatrix}\begin{bmatrix} f^{(0)} \\ f^{(1)} \\ f^{(2)} \end{bmatrix} \tag{44}$$

$$\begin{bmatrix} f^{(0)} \\ f^{(1)} \\ f^{(2)} \end{bmatrix} = \begin{bmatrix} 1 & -h_2^{(1)} & -(1/2)(h_2^{(0)} - 3h_2^{(1)} \cdot h_2^{(1)}) \\ 0 & 1 & -(3/2)h_2^{(1)} \\ 0 & 0 & 1 \end{bmatrix}\begin{bmatrix} g^{(0)} \\ g^{(1)} \\ g^{(2)} \end{bmatrix} \tag{45}$$

4.1.1.1 Summary of the Method for Computing the Output Signal from the Input Signal The method of the present invention for computing the output signal g(x) given the input signal f(x) is shown in FIG. 6 and it can be summarized as follows.

1. Pass the input signal f through a noise reduction filter to reduce the effects of noise.
2. Compute the first ($f^{(1)}$ and second ($f^{(2)}$) derivatives of the input signal f(x). Now, we have the set of derivative signals $\{f^{(0)}, f^{(1)}, f^{(2)}\}$ where $f^{(0)}=f(x)$.
3. Using the set of moment parameters $\{h_0^{(0)}, h_2^{(1)}, H_2^{(0)}\}$, compute the RT coefficients $\{S_0, S_1, S_2\}$ corresponding to each member of the set of derivative signals $\{f^{(0)}, f^{(1)}, f^{(2)}\}$. In this case, the corresponding set of RT coefficients are $S_0=1$, $S_1=h_2^{(1)}$, and $S_2=(½)(h_2^{(0)})$.
4. Multiply each member of the set of derivative signals $\{f^{(0)}, f^{(1)}, f^{(2)}\}$ with its corresponding RT coefficients in the set $\{S_0, S_1, S_2\}$ to obtain the set of product terms $\{S_0 f^{(0)}, S_1 f^{(1)}, S_2 f^{(2)}\}$.
5. Sum or add all members of the set of product terms to obtain the output signal $g^{(0)}$ 32 g(x) as $$g^{(0)}=S_0 f^{(0)}+S_1 f^{(1)}+S_2 f^{(2)}. \quad (46)$$

4.1.1.2 Summary of the Method of Computing the Input Signal from the Output Signal The method of the present invention for computing the input signal f(x) given the output signal g(x) is shown in FIG. 8 and it can be summarized as follows.

1. Pass the output signal g through a noise reduction filter to reduce the effects of noise.
2. Compute the first ($g^{(1)}$), and second ($g^{(2)}$) derivatives of the output signal g(x). Now, we have the set of derivative signals $\{g^{(0)}, g^{(1)}, g^{(2)}\}$ where $g^{(0)}=g(x)$.
3. Using the set of moment parameters $\{h_0^{(0)}, h_2^{(1)}, h_2^{(0)}\}$, compute the IRT coefficients $\{S'_0, S'_1, S'_2\}$ corresponding to each member of the set of derivative signals $\{g^{(0)}, g^{(1)}, g^{(2)}\}$. In this case, the corresponding set of IRT coefficients are $S'_0=1$, $S'_1=-h_2^{1}$, and $S'_2=(3h_2^{(1)}h_2^{(1)}-h_2^{(0)})/2$.
4. Multiply each member of the set of derivative signals $\{g^{(0)}, g^{(1)}, g^{(2)}\}$ with its corresponding IRT coefficients in the set $\{S'_0, S'_1, S'_2\}$ to obtain the set of product terms $\{S'_0 g^{(0)}, S'_1 g^{(1)}, S'_2 g^{(2)}\}$.
5. Sum or add all members of the set of product terms to obtain the output signal $f^{(0)}=f(x)$:

$$f^{(0)}=S'_0 g^{(0)}+S'_1 g^{(1)}+S'_2 g^{(2)}. \quad (47)$$

4.1.1.3 Apparatus

The apparatus for computing the output signal from the input signal is shown in FIG. 7. It includes a noise reduction filter, a derivative computing means, a moment parameter computation means, RT coefficient computation means, a product computation means, and a summation means. This apparatus may be implemented using analog or digital electronic circuits.

The apparatus for computing the input signal from the output signal is shown in FIG. 9. It includes a noise reduction filter, a derivative computing means, a moment parameter computation means, IRT coefficient computation means, a product computation means, and a summation means. This apparatus may be implemented using analog or digital electronic circuits.

4.2 Restoration of Two-Dimensional Signals

The method of the present invention can be used to restore two-dimensional signals degraded by an SV-PSF, such as blurred images of a slanted plane or a curved surface produced by a defocused camera system. For convenience, a two-dimensional signal will be referred to as an image.

An SV-PSF degraded image will be denoted by g(x,y) where x and y are independent variables which together specify points in a Cartesian coordinate system. The SV-PSF will be denoted by h(x,y,α,β) where x and y are shift-variance variables and α and β are spread function variables. The original uncorrupted input image will be denoted by f(x,y). The Rao Transform in this case is $$g(x, y) = \int_{-\infty}^{\infty}\int_{-\infty}^{\infty} h(x - \alpha, y - \beta, \alpha, \beta) f(x - \alpha, y - \beta) d\alpha\, d\beta. \quad (48)$$

The following notation will be used to represent partial derivatives of g(x,y), $f(x,y)$, and the moments of h(x,y):

$$g^{(m,n)} = \frac{\partial^m}{\partial x^m}\frac{\partial^n}{\partial y^n} g(x, y) \quad (49)$$

$$f^{(m,n)} = \frac{\partial^m}{\partial x^m}\frac{\partial^n}{\partial y^n} f(x, y) \quad (50)$$

$$h^{(m,n)} = h^{(m,n)}(x, y, \alpha, \beta) = \frac{\partial^m}{\partial x^m}\frac{\partial^n}{\partial y^n} h(x, y, \alpha, \beta) \quad (51)$$

$$h_{i,k}^{(m,n)} = \quad (52)$$

$$h_{i,k}^{(m,n)}(x, y, \alpha, \beta) = \int_{-\infty}^{\infty}\int_{-\infty}^{\infty} \alpha^i \beta^k \frac{\partial^m}{\partial x^m}\frac{\partial^n}{\partial y^n} h(x, y, \alpha, \beta) d\alpha\, d\beta$$

for $m, n = 0, 1, 2, \ldots$.

Using the above notation, the Taylor series expansion of $f(x-\alpha, y-\beta)$ around (x,y) up to order N and h(x−α,y−β,α,β) around the point (x,y,α,β) up to order M are given by $$f(x - \alpha, y - \beta) = \sum_{n=0}^{N} a_n \sum_{i=0}^{n} C_i^n \alpha^{n-i} \beta^i f^{(n-i,i)} \quad (53)$$

$$h(x - \alpha, y - \beta, \alpha, \beta) = \sum_{m=0}^{M} a_m \sum_{j=0}^{m} C_j^m \alpha^{m-j} \beta^j h^{(m-j,j)} \quad (54)$$

where $C_i^n$ and $C_j^m$ denote the binomial coefficients as defined earlier in Eq. (20) and $\alpha_m$ and $\alpha_n$ are constants as defined in Eq. (8) and Eq. (12). Substituting the above expressions into the Rao Transform of Eq. (48) and simplifying, we get $$g(x, y) = \sum_{n=0}^{N} a_n \sum_{i=0}^{n} C_i^n f^{(n-i,i)} \sum_{m=0}^{M} a_m \sum_{j=0}^{m} C_j^m h_{m+n-i-j,i+j}^{(m-j,j)} \quad (55)$$

The above equation can rewritten as $$g(x, y) = \sum_{n=0}^{N} \sum_{i=0}^{n} S_{n,i} f^{(n-i,i)} \qquad (56)$$

where $$S_{n,i} = a_n C_i^n \sum_{m=0}^{M} a_m \sum_{j=0}^{m} C_j^m h_{m+n-i-j,i+j}^{(m-j,j)} \qquad (57)$$

We can now write expressions for the various partial derivatives of g as $$g^{(p,q)} = \sum_{n=0}^{N} \sum_{i=0}^{n} \frac{\partial^p}{\partial x^p} \frac{\partial^q}{\partial y^q} [S_{n,i} f^{(n-i,i)}]. \qquad (58)$$

for $p + q = 0, 1, 2, \ldots, N$. Note that $$S_{n,i}^{(p,q)} = \frac{\partial^p}{\partial x^p} \frac{\partial^q}{\partial y^q} S_{n,i} = a_n C_i^n \sum_{m=0}^{M-(p+q)} a_m \sum_{j=0}^{m} C_j^m h_{m+n-i-j,i+j}^{(m-j+p,j+q)} \qquad (59)$$

and $$\frac{\partial^p}{\partial x^p} \frac{\partial^q}{\partial y^q} f^{(n-i,i)} = f^{(n-i+p,i+q)}. \qquad (60)$$

The above equation for $g^{(p,q)}$ for $p,q=0,1,2,\ldots,N$ and $0 \leq p+q \leq N$ constitute $(N+1)(N+2)/2$ equations in as many unknowns $f^{(p,q)}$. The system of equations for $g^{(p,q)}$ can be expressed in matrix form with a suitable RT coefficient matrix of size $(N+1)(N+2)/2$ rows and columns. These equations can be solved either numerically or algebraically to obtain $f^{(p,q)}$, and in particular, $f^{(0,0)}$. The solution for $f^{(0,0)}$ can be expressed as $$f(x, y) = f^{(0,0)} = \sum_{n=0}^{N} \sum_{i=0}^{n} S'_{n,i} g^{(n-i,i)} \qquad (61)$$

where $S'_{n,i}$ are the IRT coefficients for the 2-dimensional case.

4.2.1 EXAMPLE

Image blurring and Deblurring with a Gaussian SV-PSF

Next we present a solution for the case of N=2 and M=1 for the case of a 2-D Gaussian SV-PSF given by $$h(x, y, \alpha, \beta) = \frac{1}{2\pi\sigma^2(x, y)} \exp\left(-\frac{\alpha^2 + \beta^2}{2\sigma^2(x, y)}\right) \qquad (62)$$

We will define a new parameter $\rho(x,y)$ as $$\rho(x, y) = \frac{1}{\sigma^2(x, y)}. \qquad (63)$$

Therefore the SV-PSF can be written as $$h(x, y, \alpha, \beta) = \frac{\rho(x, y)}{2\pi} \exp\left(-\frac{\rho(x, y)(\alpha^2 + \beta^2)}{2}\right) \qquad (64)$$

For this case, as in the 1-D case, many moment parameters and their derivatives become zero. Specifically, $$h^{(1,0)} = \frac{\partial}{\partial x} h(x, y, \alpha, \beta) = \frac{\rho^{(1,0)}}{\rho} h(x, y, \alpha, \beta) \left(1 - \frac{\rho(\alpha^2 + \beta^2)}{2}\right). \qquad (65)$$

Similarly $$h^{(0,1)} = \frac{\partial}{\partial y} h(x, y, \alpha, \beta) = \frac{\rho^{(0,1)}}{\rho} h(x, y, \alpha, \beta) \left(1 - \frac{\rho(\alpha^2 + \beta^2)}{2}\right). \qquad (66)$$

We see that $h^{(1,0)}$ and $h^{(0,1)}$ are both rotationally symmetric with respect to $\alpha$ and $\beta$. Therefore all odd moments are zero, i.e.

$$h_{i,j}^{(1,0)} = h_{i,j}^{(0,1)} = 0 \text{ if } i \text{ is odd or } j \text{ is odd.} \qquad (67)$$

Also, $$h_{0,0}^{(0,0)} = \int_{-\infty}^{\infty} \int_{-\infty}^{\infty} h(x, y, \alpha, \beta) d\alpha d\beta = 1 \qquad (68)$$

for all (x,y) and therefore, all derivatives of $h_{0,0}^{(0,0)}$ with respect to x and y are zero. Also, since M=1, all derivatives of h of order more than 1 with respect to x and y are zero. In summary, $h_{0,0}^{(0,0)}=1, h_{1,0}^{(0,0)}=h_{0,1}^{(0,0)}=h_{1,1}^{(0,0)}=0,$ $h_{1,0}^{(1,0)}=H_{1,1}^{(1,0)}=H_{2,1}^{(1,0)}=H_{1,2}^{(1,0)}=h_{3,0}^{(1,0)}=0,$ $h_{0,1}^{(0,1)}=h_{1,1}^{(0,1)}=h_{2,1}^{(0,1)}=h_{1,2}^{(0,1)}=h_{0,3}^{(0,1)}=0.$ Therefore we get RT to be $$g^{(0,0)} = f^{(0,0)} + f^{(1,0)} h_{2,0}^{(1,0)} + f^{(0,1)} h_{0,2}^{(0,1)} + \frac{1}{2} f^{(2,0)} h_{2,0}^{(0,0)} + \frac{1}{2} f^{(0,2)} h_{0,2}^{(0,0)} \qquad (69)$$

The above equation gives a method of computing the output signal g(x,y) given the input signal f(x,y). It can be written in a form similar to Eq. (56) to obtain the RT coefficients $S_{n,i}$.

We can derive the inverse RT for this case using Equation (69). As in the 1-dimensional case, we consider the various derivatives of g in Eq. (69) and solve for the derivatives of f as unknowns. In this particular example, we first solve for $f^{(0,0)}$ in terms of other terms using Eq. (69). Then, we take the derivative of the expression for $f^{(0,0)}$ with respect to x and solve for $f^{(0,1)}$. Next we take the derivative of $f^{(0,0)}$ with respect to y and solve for $f^{(0,1)}$. Then we take the derivative with respect to x of $f^{(1,0)}$ and $f^{(0,1)}$ and solve for $f^{(2,0)}$ and $f^{(1,1)}$ respectively. Similarly we take derivatives with respect to y of $f^{(0,1)}$ and $f^{(1,0)}$ and solve for $f^{(0,2)}$ and $f^{(1,1)}$ respectively. Finally, we back substitute these results and eliminate $f^{(1,0)}, f^{(0,1)}, f^{(2,0)}, f^{(1,1)},$ and $f^{(0,2)}$ to get the following explicit solution for $f^{(0,0)}$ in terms of the derivatives of g and moments of the derivatives of h as below $$f^{(0,0)} = g^{(0,0)} - g^{(1,0)} h_{2,0}^{(1,0)} - g^{(0,1)} h_{0,2}^{(0,1)} + \qquad (70)$$
$$g^{(2,0)}\left(\frac{3}{2}(h_{2,0}^{(1,0)})^2 + \frac{1}{2} h_{0,2}^{(0,1)} h_{2,0}^{(0,1)} - \frac{1}{2} h_{2,0}^{(0,0)}\right) +$$
$$g^{(0,2)}\left(\frac{3}{2}(h_{0,2}^{(0,1)})^2 + \frac{1}{2} h_{2,0}^{(1,0)} h_{0,2}^{(1,0)} - \frac{1}{2} h_{0,2}^{(0,0)}\right)$$

Further simplification of the above equation is possible due to rotational symmetry (e.g. $h_{2,0}^{(1,0)} = h_{0,2}^{(0,1)}$, and $h_{2,0}^{(0,0)} = h_{0,2}^{(0,0)}$). The above equation gives an explicit, closed-form, formula for restoring an image blurred by a shift-variant Gaussian point spread function. The above equation can be written in a form similar to Equation (61) for inverse RT to obtain the IRT coefficients. It is clear from the above discussion that the method and apparatus for implementing the forward and inverse RT for the two-dimensional case is similar to the one-dimensional case explained earlier.

4.3 Application to Multi-Dimensional Signals

As mentioned earlier, the method of the present invention can be used for signals of any dimensionality. Here the restoration method will be briefly summarized for an n-dimensional signal where n is any positive integer. For the sake of convenience, the notation xi will be used to denote n variables $(x_1, x_2, x_3, \ldots, x_n)$. For example, $f(x_i)$ represents a function $f$ of n variables, i.e. $f(x_1, x_2, x_3, \ldots, x_n)$. The shift-variant output signal is denoted by $g(x_i)$, the SV-PSF kernel by $h(x_i, \alpha_i)$, and the original input signal by $f(x_i)$. The partial derivatives of $g(x_i)$ are denoted by $$g^{(i_1, i_2, \ldots, i_p)} = \frac{\partial}{\partial x_{i_1}} \frac{\partial}{\partial x_{i_2}} \cdots \frac{\partial}{\partial x_{i_p}} g(x_i) \qquad (71)$$

where $i_k = 1, 2, \ldots, n$ for $k = 1, 2, \ldots, p$. A similar notation is used for the partial derivatives of $f(x_i)$ and $h(x_i, \alpha_i)$.

The moments of the derivatives of the SV-PSF kernel are denoted by $$h_{j_1, j_2, \ldots, j_q}^{(i_1, i_2, \ldots, i_p)}(x_i) = \qquad (72)$$
$$\int_{-\infty}^{\infty} d\alpha_{j_1} \int_{-\infty}^{\infty} d\alpha_{j_2} \cdots \int_{-\infty}^{\infty} d\alpha_{j_q} \alpha_{j_1} \alpha_{j_2} \cdots \alpha_{j_q} h^{(i_1, i_2, \ldots, i_p)}(x_i, \alpha_j)$$

where $i_k = 1, 2, \ldots, n$ for $k = 1, 2, \ldots, p$ and $j_k = 1, 2, \ldots n$ for $k = 1, 2, \ldots, q$. Einstein's notation for summation can be used (i.e. summation is implied over repeated indices) to express the Taylor series expansion of $f(x_i - \alpha_i)$ around the point $x_i$ as $$f(x_i - \alpha_i) = f(x_i) + (-\alpha_{i_1}) f^{(i_1)} + \qquad (73)$$
$$\frac{1}{2!}(-\alpha_{i_1})(-\alpha_{i_2}) f^{(i_1, i_2)} + \frac{1}{3!}(-\alpha_{i_1})(-\alpha_{i_2})(-\alpha_{i_3}) f^{(i_1, i_2, i_3)} + $$
$$\ldots + \frac{1}{n!}\left[\prod_{k=1}^{n}(-\alpha_{i_k})\right] f^{(i_1, i_2, \ldots, i_n)} + \ldots$$

Similarly we use the Taylor series expansion of $h(x_i - \alpha_i, \alpha_i)$ around the point $(x_i, \alpha_i)$. We substitute these Taylor series expansions in the definition of Rao Transform:

$$g(x_i) = \int_{-\infty}^{\infty} h(x_i - \alpha_i, \alpha_i) f(x_i - \alpha_i) d\alpha_i \qquad (74)$$

Taking all partial derivatives of $f(x_i)$ of order greater than N to be zero, i.e. taking $f^{(i_1, i_2, \ldots, i_p)} = 0$ for $p > N$, and taking all partial derivatives of $h(x_i, \alpha_i)$ with respect to $x_i$ of order greater than M to be zero, i.e. taking $h^{(i_1, i_2, \ldots, i_p)} = 0$ for $p > M$, we can derive a simplified expression for $g^{(0, \ldots, 0)}(x_i)$. It can be written in the form $$g^{(0, \ldots, 0)}(x_i) = \sum S_{i_1, i_2, \ldots, i_p} f^{(i_1, i_2, \ldots, i_p)} \qquad (75)$$

where $S_{i_1, i_2, \ldots, i_p}$ are the RT coefficients.

This equation suggests a method and apparatus similar to the one for one and two dimensional cases for computing the output signal g from the input signal f. Eq. (75) can be used to derive expressions for various derivatives of g and solve the resulting expressions for the derivatives of f Then the solution for f(x) gives the inverse RT which can be expressed in the form $$f^{(0, \ldots, 0)}(x_i) = \sum S'_{i_1, i_2, \ldots, i_p} g^{(i_1, i_2, \ldots, i_p)}. \qquad (76)$$

Inverse RT coefficients in this case are $S'_{i_1, i_2, \ldots, i_q}$ which are functions of the moments of the derivatives of h. Next we derive expressions for various derivatives of g and solve the resulting equations to obtain $f(x_i)$ in terms of the derivatives of $g(x_i)$ and the moments of the derivatives $h_{j_1, j_2, \ldots, j_q}^{(i_1, i_2, \ldots, i_p)}(x_i)$ of the SV-PSF h. Therefore, the method and apparatus in this case for computing the input signal f from the output signal g are similar to those of the one-dimensional and two-dimensional signals.

4.4 Summary of the Invention for 1, 2, AND M Dimensional Signals

The methods and apparatus of the present invention for 1, 2, and m-dimensional signals where m is any positive integer can be summarized as below.

The method of computing the output signal g(x) of a Linear Shift-Variant System (LSVS) at a point x in a m-dimensional space where m is any positive integer (e.g. 1,2,3,...) greater than zero has four main steps. It is also shown in FIG. 6. The output g(x) is computed using the input signal f(x) and the SV-PSF h(x,α) that completely characterizes the LSVS. The SV-PSF h(x,α) is assumed to be shift-variant with respect to x and spread-variant with respect to α. The first step is computing a set of Rao Transform (RT) coefficients $S_n$ of the input signal f(x) with respect to the SV-PSF h(x,α). In the general multi-dimensional case, Rao Transform (RT) is defined by an expression that is a definite integral with respect to α of the product of h(x-α,α) and f(x-α) where x and α are multi-dimensional (one or more) vectors. The limits of the definite integral are theoretically negative infinity (lower limit) and positive infinity (upper limit), but in a practical application, they may be finite numbers depending on the nature of the LSVS. The RT coefficients $S_n$ are obtained by a three step process. In the definite integral that defines ST, a truncated Taylor series expansion of $h(x-\alpha,\alpha)$ around the point $(x,\alpha)$, and also a truncated Taylor series expansion of $f(x-\alpha)$ around the point x are substituted. The resulting expression is simplified and rearranged so that it becomes a sum of a set of product terms wherein each product term is the result of multiplying a derivative of $f(x)$ with respect to x at x and a coefficient that determines $S_n$. This coefficient is expressed in terms of a set of moments with respect to $\alpha$ of the zero-th and higher order derivatives with respect to x of the SV-PSF h.

Having thus computed the RT coefficient $S_n$, next compute a set of derivatives of $f(x)$ with respect to x at x. Since x is a multi-dimensional vector, one needs to consider partial derivatives with respect to different components of x of various orders. Then compute a set of product terms obtained by multiplying each RT coefficient $S_n$ by its corresponding input signal derivative. Finally, all members of the set of product terms are summed or added to obtain the output signal $g(x)$ of the LSVS.

The method of computing the input or restored signal $f(x)$ of an LSVS at a point x in a m-dimensional space where m is a positive integer greater than zero is summarized next. It is also shown in FIG. 8. For an LSVS, the problem is to compute the input $f(x)$ corresponding to an output or degraded signal $g(x)$ wherein the LSVS is characterized by a Shift-Variant Point Spread Function (SV-PSF) $h(x,\alpha)$. Here the SV-PSF h is taken to be shift-variant with respect to x and spread-variant with respect to $\alpha$. A good physical example of such an SV-PSF is that of a misfocused camera that images a slanted planar object such as a poster. This method comprises the following four main steps.

a. First, compute a set of Inverse Rao Transform (IRT) coefficients $S'_n$ corresponding to the output signal $g(x)$ and the SV-PSF $h(x,\alpha)$. Each IRT coefficient $S'_n$ is determined as follows:
   1. Consider expression $E_0$ for the output signal $g(x)$ as a sum of a set of product terms wherein each product term is the result of multiplying a derivative of the input signal $f(x)$ and a Rao Transform coefficient $S_n$ that corresponds to said derivative;
   2. Take different derivatives of the expression $E_0$ with respect to x and obtain one equation corresponding to each derivative taken. Since x may be a variable with more than one dimension, various partial derivatives with respect to different components of x should be taken. Also, partial derivatives of different orders such as 0,1,2,3, ..., N should be taken. Taking such partial derivatives results in a set of equations in which the different derivatives of the input signal $f(x)$ are the only unknowns. In this set of equations, the other quantities such as the various derivatives of the output signal $g(x)$ and the RT coefficients $S_n$ will all be known quantities.
   3. Solve the set of equations for all the unknowns and express the solution for the zero-th order derivative of the input signal (which is the same as the input signal) as a sum of a set of product terms. This set should be such that each product term should be the result of multiplying a derivative of the output signal $g(x)$ and a coefficient that is defined to be the Inverse Rao Transform coefficient $S'_n$. This coefficient will be dependent on the known forward RT coefficients $S_n$. Note that this $S_n$ itself will be dependent on a set of moments with respect to $\alpha$ of the zero-th and higher order derivatives with respect to x of the SV-PSF h. Thus all IRT coefficients $S'_n$ are completely and explicitly determined in closed-form in terms of the moment parameters of the SV-PSF. These moment parameters specify certain global characteristics of the SV-PSF. They can be computed from the SVPSF itself, or experimentally through calibration in a practical LSVS.

b. After computing the IRT coefficients $S'_n$, compute a set of derivatives with respect to x at x of the output signal $g(x)$.

c. Then multiply each IRT coefficient $S'_n$ by its corresponding output signal derivative to obtain a set of product terms.

d. Finally, sum or add all members of the set of product terms above to obtain the input or restored signal $f(x)$ of the LSVS.

The apparatus for computing the output signal $g(x)$ of an LSVS corresponding to an input signal $f(x)$, wherein the LSVS is characterized by a Shift-Variant Point Spread Function (SV-PSF) $h(x,\alpha)$ is shown in FIG. 7. It comprises the following.

1. It includes a differentiation means for computing the derivatives of the input signal $f(x)$ to obtain a set of derivative signals. Since x may be a multi-dimensional variable, this differentiation means should be capable of taking partial derivatives of different orders with respect to different components of x.

2. It also includes a Rao Transform (RT) coefficient computation means for computing the RT coefficients $S_n$ of the input signal $f(x)$ with respect to said SV-PSF h. This component may involve first computing the moment parameters of the SV-PSF from a description of the SV-PSF, and then another component for computing the RT coefficient from the moment parameters.

3. It includes a multiplication means for multiplying each member of the set of derivative signals with its corresponding Rao Transform coefficient $S_n$ to obtain a set of product terms.

4. Lastly, it includes a summation means for summing the set of product terms to obtain the desired output signal.

The apparatus for computing the input or restored signal $f(x)$ of a Linear Shift-Variant System (LSVS) corresponding to an output signal $g(x)$, wherein the LSVS is characterized by a Shift-Variant Point Spread Function (SV-PSF) $h(x,\alpha)$ is shown in FIG. 9. It comprises the following components.

1. It includes a differentiation means for computing the derivatives of the output signal $g(x)$ to obtain a set of derivative signals. Since x may be a multi-dimensional variable, this differentiation means should be capable of taking partial derivatives of different orders with respect to different components of x.

2. It also includes an Inverse Rao Transform (IRT) coefficient computation means for computing the IRT coefficients $S'_n$ of the output signal $g(x)$ with respect to said SV-PSF h. This component may involve first computing the moment parameters of the SV-PSF from a description of the SV-PSF, and then another component for computing the IRT coefficient from the moment parameters.

3. It includes a multiplication means for multiplying each member of the set of derivative signals with its corresponding Inverse Rao Transform coefficient $S'_n$ to obtain a set of product terms.

4. Lastly, it includes a summation means for summing the set of product terms to obtain the desired input signal.

5.0 CONCLUSION

Methods and apparatus are described for efficiently computing the input (or restored) signal and the output signal of a Linear Shift-Variant System such as a misfocused camera using the recently invented Rao Transform. Explicit closed-form expressions are derived for the forward and inverse Rao Transform which facilitate the methods and apparatus of the present invention. The application of this invention to one-dimensional and two-dimensional signals are explained with examples. It is generalized to n-dimensional signals for any positive integer n.

While the description in this report of the methods, apparatus, and applications contain many specificities, these should not be construed as limitations on the scope of the invention, but rather as exemplifications of preferred embodiments thereof. Further modifications and extensions of the present invention herein disclosed will occur to persons skilled in the art to which the present invention pertains, and all such modifications are deemed to be within the scope and spirit of the present invention as defined by the appended claims and their equivalents thereof.

What is claimed is:

1. A computer-readable storage medium, having instructions stored thereon for causing a computer programmed thereby to perform the following method:

reading an input signal data f(x) of a Linear Shift-Variant System (LSVS) where x is an m-dimensional variable, said LSVS characterized by a Shift-Variant Point Spread Function (SV-PSF) $h(x,\alpha)$, and generating an output signal data g(x) of said LSVS corresponding to said input signal data f(x) of said LSVS by performing the steps comprising:

a. Determining through computations a set of Rao Transform (RT) coefficients $S_n$ of said input signal data f(x) with respect to said SV-PSF $h(x,\alpha)$ wherein said Rao Transform (RT) is defined by an expression that is a definite integral with respect to $\alpha$ of the product of $h(x-\alpha,\alpha)$ and $f(x-\alpha)$, said coefficients $S_n$ determined by:
  1. substituting a truncated Taylor series expansion of $h(x-\alpha,\alpha)$ around the point $(x,\alpha)$ in said expression that defines RT,
  2. substituting a truncated Taylor series expansion of $f(x-\alpha)$ around the point x in said expression that defines RT,
  3. simplifying said expression after the substitutions above as a sum of a set of product terms wherein each product term is the result of multiplying a derivative of f(x) with respect to x at x and a coefficient that determines $S_n$ and expressed in terms of a set of moments with respect to $\alpha$ of the zero-th and higher order derivatives with respect to x of said SV-PSF h;

b. determining through computations a set of derivatives $f^{(n)}$ of f(x) with respect to x at x of said input signal data f(x);

c. determining through computations a set of product terms generated by multiplying each RT coefficient $S_n$ by its corresponding derivative of input signal data $f^{(n)}$, d. summing or adding all members of said set of product terms to generate the output signal data g(x) of said LSVS.

2. The method of claim 1 wherein said input signal data is first processed by a noise reduction filter before further processing according to steps (a) through (d).

3. The method of claim 1 wherein said SV-PSF is a Gaussian function.

4. The method of claim 1 wherein said input signal data and output signal data are one-dimensional wherein x and $\alpha$ each represent a single scalar variable.

5. The method of claim 1 wherein said input signal data and output signal data are two-dimensional wherein x and $\alpha$ each represent a vector with two components.

6. The method of claim 5 wherein said two-dimensional input signal data and output signal data are images.

7. The method of claim 1 wherein said LSVS is an imaging optical system.

8. A computer-readable storage medium, having instructions stored thereon for causing a computer programmed thereby to perform the following method:

reading an output signal data or degraded signal data g(x) of a Linear Shift-Variant System (LSVS) corresponding to an input signal data f(x) of said LSVS where x is an m-dimensional variable, said LSVS characterized by a Shift-Variant Point Spread Function (SV-PSF) $h(x,\alpha)$, and generating through computations said input signal data or restored signal data f(x) of said LSVS by performing the steps comprising:

a. Determining through computations a set of Inverse Rao Transform (IRT) coefficients $S'_n$ corresponding to said output signal data g(x) and said SV-PSF $h(x,\alpha)$ wherein each IRT coefficient $S'_n$ is determined by
  i. considering an expression for said output signal data g(x) as a sum of a set of product terms wherein each product term is the result of multiplying a derivative $f^{(n)}$ of said input signal data f(x) and a Rao Transform coefficient $S_n$ that corresponds to said derivative,
  ii. determining different derivatives of said expression with respect to x and obtaining one equation corresponding to each derivative to obtain a set of equations in which the different derivatives $f^{(n)}$ of said input signal data f(x) are the only unknowns, and
  iii. solving said set of equations and expressing the solution for the zero-th order derivative of said input signal data as a sum of a set of product terms wherein each product term is the result of multiplying a derivative $g^{(n)}$ of said output signal g(x) and a coefficient that is defined to be the Inverse Rao Transform coefficient $S'_n$, b. determining through computations a set of derivatives with respect to x at x of said output signal data g(x), c. multiplying each IRT coefficient $S'_n$ by its corresponding output signal data derivative $g^{(n)}$ to obtain a set of product terms, d. summing or adding all members of said set of product terms to obtain the input signal data or restored signal data f(x) of said LSVS.

9. The method of claim 8 wherein said output signal data is first processed by a noise reduction filter before further processing according to steps (a) through (d).

10. The method of claim 8 wherein said input signal data and output signal data are one-dimensional wherein x and $\alpha$ each represent a single scalar variable.

11. The method of claim 8 wherein said SV-PSF is a Gaussian function.

12. The method of claim 8 wherein said input signal data and output signal data are two-dimensional signals wherein x and $\alpha$ each represent a vector with two components.

13. The method of claim 12 wherein said two-dimensional input signal data and output signal data are images.

14. The method of claim 8 wherein said LSVS is an imaging optical system.

15. Apparatus for computing and storing an input signal data or restored signal data f(x) of a Linear Shift-Variant System (LSVS) corresponding to an output signal data g(x), said LSVS characterized by a Shift-Variant Point Spread Function (SV-PSF) h(x,α), said apparatus comprising:

i. a differentiation means for computing derivatives of said output signal data g(x) to obtain a set of derivative signal data, ii. an Inverse Rao Transform (IRT) coefficient computation means for computing said IRT coefficients $S'_n$ of said output signal data g(x) with respect to said SV-PSF h, iii. a multiplication means for multiplying each member of said set of derivative signal data with its corresponding IRT coefficient $S'_n$ to obtain a set of product terms, and iv. a summation means for summing said set of product terms to obtain said input signal data or restored signal data.

16. The apparatus of claim 15 wherein computing means are electronic digital devices.

17. The apparatus of claim 15 which further includes a noise reduction means.

18. Apparatus for computing and storing an output signal data g(x) of a Linear Shift-Variant System (LSVS) corresponding to an input signal data f(x), said LSVS characterized by a Shift-Variant Point Spread Function (SV-PSF) h(x,α) said apparatus comprising:

i. a differentiation means for computing derivatives of said input signal data f(x) to obtain a set of derivative signal data $f^{(n)}$, ii. a Rao Transform (RT) coefficient computation means for computing the RT coefficients $S_n$ of said input signal data f(x) with respect to said SV-PSF h, iii. a multiplication means for multiplying each member of said set of derivative signal data $f^{(n)}$ with its corresponding Rao Transform coefficient $S_n$ to obtain a set of product terms, and iv. a summation means for summing said set of product terms to obtain said output signal.

19. The apparatus of claim 18 wherein computing means are electronic digital devices.

20. The apparatus of claim 18 which further includes a noise reduction means.

\* \* \* \* \*